(12) United States Patent
Lasserre

(10) Patent No.: US 12,634,504 B2
(45) Date of Patent: May 19, 2026

(54) MOTION COMPENSATION BASED NEIGHBORHOOD CONFIGURATION FOR TRISOUP CENTROID INFORMATION

(71) Applicant: Comcast Cable Communications, LLC, Philadelphia, PA (US)

(72) Inventor: Sébastien Lasserre, Thorigné-Fouillard (FR)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/394,643

(22) Filed: Dec. 22, 2023

(65) Prior Publication Data

US 2024/0214600 A1 Jun. 27, 2024

Related U.S. Application Data

(60) Provisional application No. 63/434,526, filed on Dec. 22, 2022.

(51) Int. Cl.
H04N 19/51 (2014.01)
H04N 19/124 (2014.01)

(52) U.S. Cl.
CPC .......... H04N 19/51 (2014.11); H04N 19/124 (2014.11)

(58) Field of Classification Search
CPC .............................. H04N 19/51; H04N 19/124
See application file for complete search history.

(56) References Cited

U.S. PATENT DOCUMENTS

| | | | | |
|---|---|---|---|---|
| 2022/0224940 A1* | 7/2022 | Hur | ............................ | G06T 9/40 |
| 2022/0337872 A1 | 10/2022 | Park et al. | | |
| 2023/0014844 A1* | 1/2023 | Hendry | ................ | H04N 19/136 |
| 2025/0037319 A1* | 1/2025 | Hendry | ................ | H04N 21/434 |

FOREIGN PATENT DOCUMENTS

| | | | | | |
|---|---|---|---|---|---|
| CN | 114143556 A | * | 3/2022 | ........... | H04N 19/159 |
| WO | WO-2024042909 A1 | * | 2/2024 | ........... | H04N 19/119 |

OTHER PUBLICATIONS

Ito, Atsushi WO 2024042909 A1 Jul. 14, 2023 (Year: 2023).*
Lin, Yi-Ge CN 114143556 A Dec. 28, 2021 (Year: 2021).*
M60656, MPEG Meeting, Oct. 11-Dec. 7, 2022, Source: Ofinno, Sebastien Lasserre, J. Taquet (Xiaomi) Title: [GPCC] Report for EE 13.60 on dynamic dense coding with G-PCC.

(Continued)

*Primary Examiner* — Zaihan Jiang
(74) *Attorney, Agent, or Firm* — Banner & Witcoff, Ltd.

(57) ABSTRACT

One or more methods, apparatuses, computer-readable storage mediums, and systems for entropy coding vertex information of an edge in a voxelized space of a point cloud are disclosed. Symbols of a neighborhood configuration of a current edge may be determined based on one or more already coded edges. The already coded edges may be selected from a spatial topology of edges. The use of a motion-compensated point cloud for coding centroid residual values may enhance interframe correlation used for determining a context or probability model. This increased correlation may improve the selection of coders, leading to enhanced compression of centroid residual values.

23 Claims, 24 Drawing Sheets

(56) References Cited

OTHER PUBLICATIONS

M59290, MPEG Meeting, Apr. 12-24, 2022, Source: Xiaomi, Sebastien Lasserre, Title: [GPCC][TriSoup] Part 3 Adding a residual for the centroid vertex.

M61582, MPEG Meeting, Jan. 16-Jan. 20, 2023, Source: Ofinno, Sebastien Lasserre, Title: [GPCC][EE13.60] An inter TriSoup scheme based on motion compensated point cloud.

M60494, MPEG Meeting, Jul. 14, 2022, Source: Xiaomi, Sebastien Lasserre, J. Taquet, Title: [GPCC] A workplan for GPCCv2 on dense and dynamic contents.

Apr. 18, 2024—International Search Report—WO App. No. PCT/US2023/085777.

* cited by examiner

414

402

408

410

406

412

400

404

Determine a centroid residual value of a TriSoup node
_1602_

Selecting a probability model for encoding the centroid residual value based on a motion compensated point cloud
_1604_

Entropy encoding the centroid residual value based on the context/probability model
_1606_

_1600_

Figure 16B:
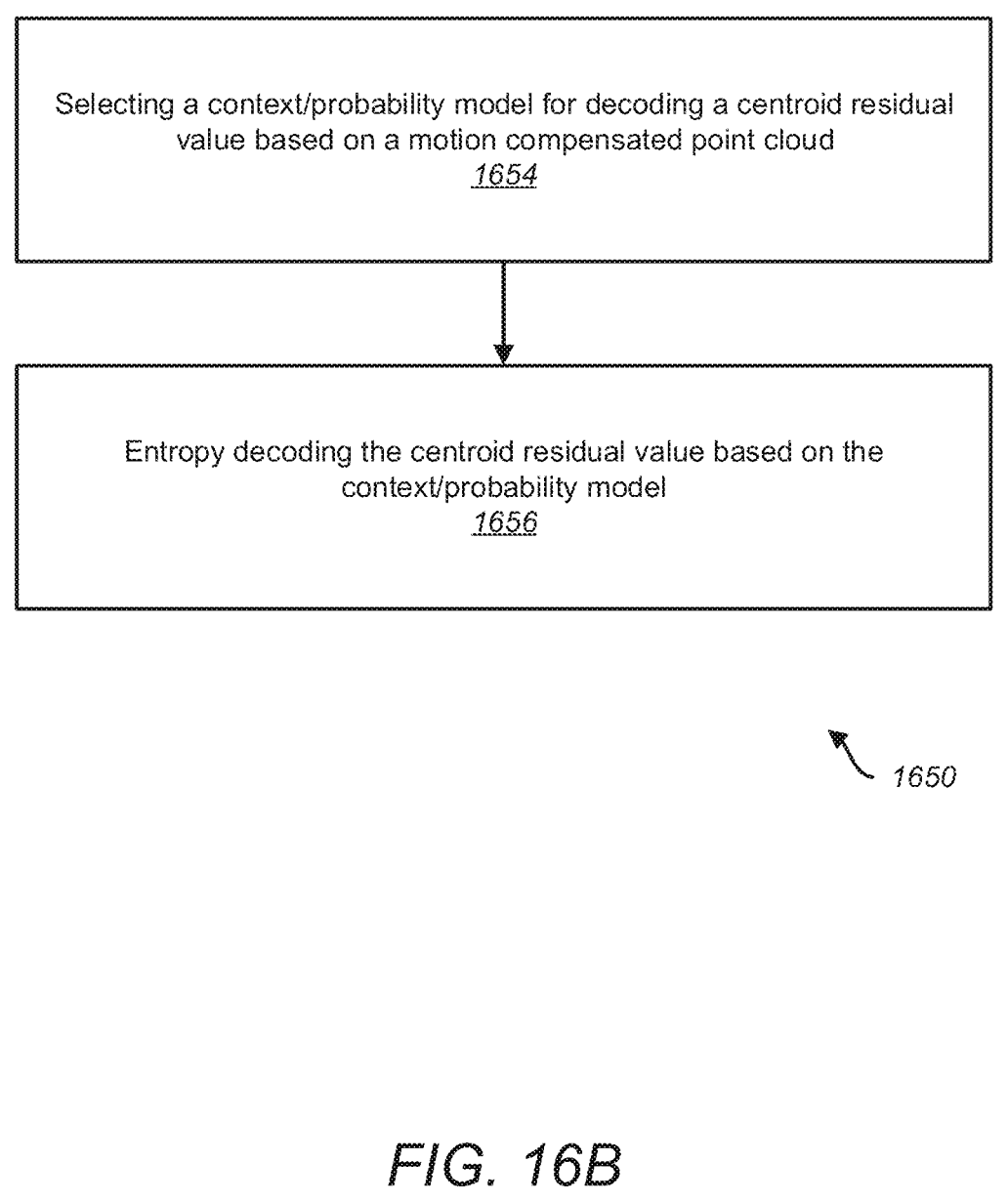

Selecting a context/probability model for decoding a centroid residual value based on a motion compensated point cloud
_1654_

Entropy decoding the centroid residual value based on the context/probability model
_1656_

MOTION COMPENSATION BASED NEIGHBORHOOD CONFIGURATION FOR TRISOUP CENTROID INFORMATION

CROSS-REFERENCE TO RELATED APPLICATIONS

This application claims the benefit of U.S. Provisional Application No. 63/434,526 filed on Dec. 22, 2022. The above referenced application is hereby incorporated by reference in its entirety.

BACKGROUND

An object or scene may be described using volumetric visual data consisting of a series of points. The points may be stored as a point cloud format that includes a collection of points in three-dimensional space. As point clouds can get quite large in data size, transmitting and processing point cloud data may need a data compression scheme that is specifically designed with respect to the unique characteristics of point cloud data.

SUMMARY

The following summary presents a simplified summary of certain features. The summary is not an extensive overview and is not intended to identify key or critical elements.

Coding (e.g., encoding, decoding) may be used to compress and decompress a point cloud frame or sequence for efficient storage and transmission. A point cloud coding system may comprise a source device that may encode a point cloud sequence into a bitstream. The point cloud coding system may comprise a transmission medium that transmits the encoded bitstream. The point cloud coding system may comprise a destination device that may obtain a decoded point cloud sequence based on the encoded bitstream. Visual data (e.g., a centroid residual value) may be coded (e.g., encoded or decoded) based on a context (or a probability model). The context (or the probability model) may be selected, for example, based on a look-up table to code the centroid residual value. Based on the coded centroid residual value and a first centroid vertex of a TriSoup, a second centroid vertex of the TriSoup may be determined. By using the second centroid vertex as a pivoting vertex, reconstruction error and/or distortion may be reduced.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 16B shows an example method of decoding a centroid residual value of a TriSoup node.

DETAILED DESCRIPTION

Figure 1:
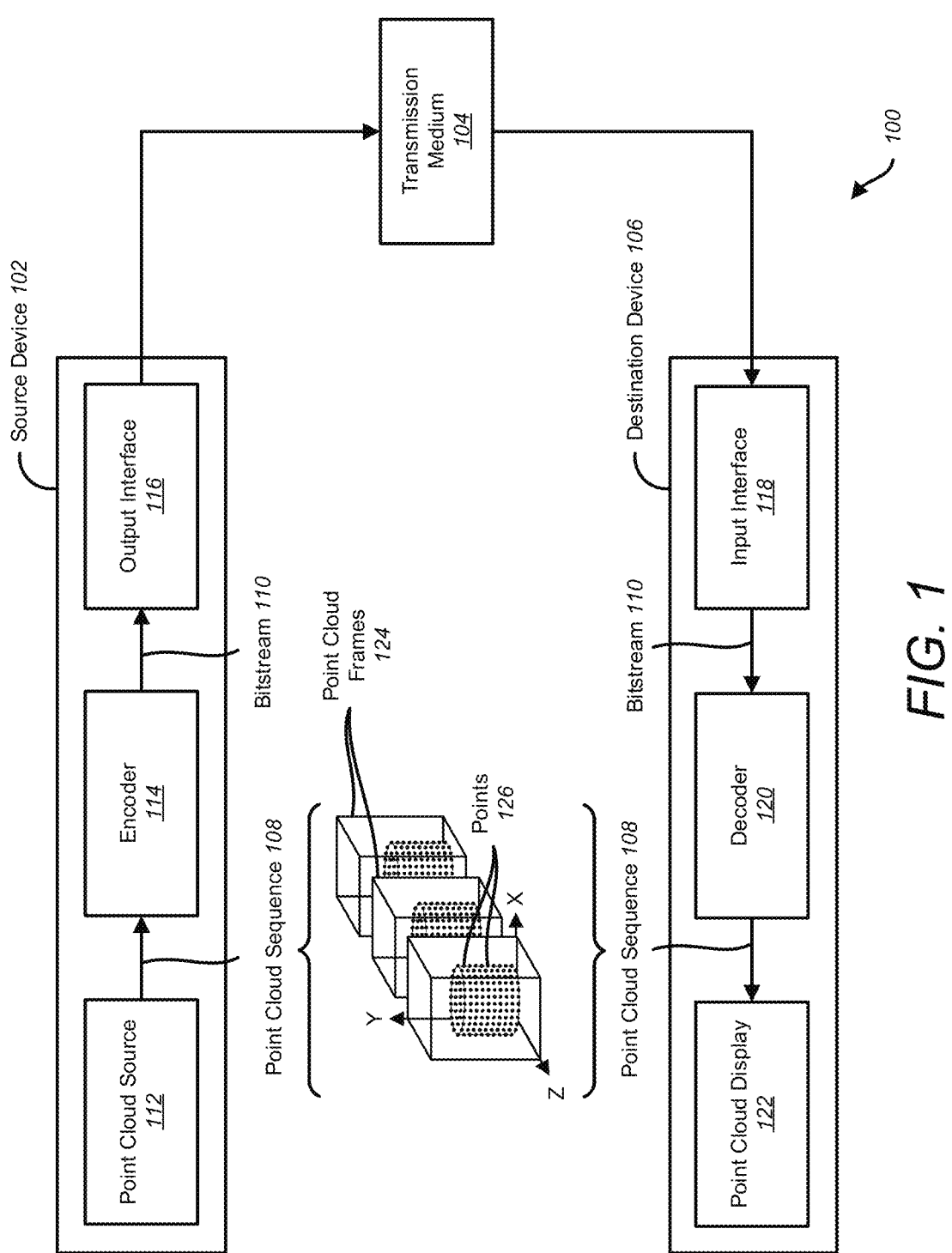
FIG. 1 shows an example point cloud coding system.

The accompanying drawings and descriptions provide examples. It is to be understood that the examples shown in the drawings and/or described are non-exclusive, and that features shown and described may be practiced in other examples. Examples are provided for operation of point cloud or point cloud sequence encoding or decoding systems. More particularly, the technology disclosed herein may relate to point cloud compression as used in encoding and/or decoding devices and/or systems.

Visual data may describe an object or scene using a series of points. Each point may comprise a position in two dimensions (x and y) and one or more optional attributes like color. Volumetric visual data may add another positional dimension to this visual data. Volumetric visual data may describe an object or scene using a series of points that each comprise a position in three dimensions (x, y, and z) and one or more optional attributes like color, reflectance, time stamp, etc. Volumetric visual data may provide a more immersive way to experience visual data, for example, than traditional visual data.

For example, an object or scene described by volumetric visual data may be viewed from any (or multiple) angles, whereas traditional visual data may generally only be viewed from the angle in which it was captured or rendered. Volumetric visual data may be used in many applications, including augmented reality (AR), virtual reality (VR), and mixed reality (MR). Sparse volumetric visual data may be used in the automotive industry for the representation of three-dimensional (3D) maps (e.g., cartography) or as input to assisted driving systems. In the case of assisted driving systems, volumetric visual data may be typically input to driving decision algorithms. Volumetric visual data may be used to store valuable objects in digital form. In applications for preserving cultural heritage, the goal may be to keep a representation of objects that may be threatened by natural disasters. For example, statues, vases, and temples may be entirely scanned and stored as volumetric visual data having several billions of samples. This use-case for volumetric visual data may be particularly relevant for valuable objects in locations where earthquakes, tsunamis, and typhoons are frequent. Volumetric visual data may take the form of a volumetric frame. The volumetric frame may describe an object or scene captured at a particular time instance. Volumetric visual data may take the form of a sequence of volumetric frames (referred to as a volumetric sequence or volumetric video). The sequence of volumetric frames may describe an object or scene captured at multiple different time instances.

Point clouds are one format for storing volumetric visual data. A point cloud may comprise a collection of points in 3D space. Each point in a point cloud may comprise geometry information that indicates the point's position in 3D space. The geometry information may indicate the point's position in 3D space, for example, using three Cartesian coordinates (x, y, and z) or using spherical coordinates (r, phi, theta) (e.g., if acquired by a rotating sensor). The positions of points in a point cloud may be quantized according to a space precision. The space precision may be the same or different in each dimension. The quantization process may create a grid in 3D space. One or more points residing within each sub-grid volume may be mapped to the sub-grid center coordinates, referred to as voxels. A voxel may be considered as a 3D extension of pixels corresponding to the 2D image grid coordinates. A point in a point cloud may further comprise one or more types of attribute information. Attribute information may indicate a property of a point's visual appearance. Attribute information may indicate, for example, a texture (e.g., color) of the point, a material type of the point, transparency information of the point, reflectance information of the point, a normal vector to a surface of the point, a velocity at the point, an acceleration at the point, a time stamp indicating when the point was captured, or a modality indicating how the point was captured (e.g., running, walking, or flying). A point in a point cloud may comprise light field data in the form of multiple view-dependent texture information. Light field data may be another type of optional attribute information.

The points in a point cloud may describe an object or a scene. The points in a point cloud may describe, for example, the external surface and/or the internal structure of an object or scene. The object or scene may be synthetically generated by a computer. The object or scene may be generated from the capture of a real-world object or scene. The geometry information of a real-world object or a scene may be obtained by 3D scanning and/or photogrammetry. 3D scanning may include different types of scanning, for example, laser scanning, structured light scanning, and/or modulated light scanning. 3D scanning may obtain geometry information. 3D scanning may obtain geometry information, for example, by moving one or more laser heads, structured light cameras, and/or modulated light cameras relative to an object or scene being scanned. Photogrammetry may obtain geometry information. Photogrammetry may obtain geometry information, for example, by triangulating the same feature or point in different spatially shifted 2D photographs. Point cloud data may take the form of a point cloud frame. The point cloud frame may describes an object or scene captured at a particular time instance. Point cloud data may take the form of a sequence of point cloud frames. The sequence of point cloud frames may be referred to as a point cloud sequence or point cloud video. The sequence of point cloud frames may describe an object or scene captured at multiple different time instances.

The data size of a point cloud frame or point cloud sequence may be too large for storage and/or transmission in many applications. A single point cloud may comprise, for example, over a million points or even a billions of points. Each point may comprise geometry information and one or more optional types of attribute information. The geometry information of each point may comprise three Cartesian coordinates (x, y, and z) or spherical coordinates (r, phi, theta) that are each represented, for example, using at least 10 bits per component or 30 bits in total. The attribute information of each point may comprise a texture corresponding to three color components (e.g., R, G, and B color components). Each color component may be represented, for example, using 8-10 bits per component or 24-30 bits in total. A single point therefore may comprise at least 54 bits of information in this example, with at least 30 bits of geometry information and at least 24 bits of texture. If a point cloud frame includes a million such points, each point cloud frame may require 54 million bits or 54 megabits to represent. For dynamic point clouds that change over time, at a frame rate of 30 frames per second, a data rate of 1.32 gigabits per second may be required to send (e.g., transmit) the points of the point cloud sequence. Therefore, raw representations of point clouds may require a large amount of data and the practical deployment of point-cloud-based technologies may need compression technologies that enable the storage and distribution of point clouds with reasonable cost.

Encoding may be used to compress and/or reduce the data size of a point cloud frame or point cloud sequence to provide for more efficient storage and/or transmission. Decoding may be used to decompress a compressed point cloud frame or point cloud sequence for display and/or other forms of consumption (e.g., by a machine learning based device, neural network-based device, artificial intelligence-based device, or other forms of consumption by other types of machine-based processing algorithms and/or devices). Compression of point clouds may be lossy (introducing differences relative to the original data) for the distribution to and visualization by an end-user, for example, on AR or VR glasses or any other 3D-capable device. Lossy compression may allow for a high ratio of compression but may imply a trade-off between compression and visual quality perceived by an end-user. Other frameworks, for example, frameworks for medical applications or autonomous driving, may require lossless compression to avoid altering the results of a decision obtained based on the analysis of the sent (e.g., transmitted) and decompressed point cloud frame.

FIG. 1 shows an example point cloud coding (e.g., encoding and/or decoding) system (e.g., point cloud coding system 100). Point cloud coding system 100 may comprise a source device 102, a transmission medium 104, and a destination device 106. Source device 102 may encode a point cloud sequence 108 into a bitstream 110 for more efficient storage and/or transmission. Source device 102 may store and/or send (e.g., transmit) bitstream 110 to destination device 106 via transmission medium 104. Destination device 106 may decode bitstream 110 to display point cloud sequence 108 or for other forms of consumption (e.g., further analysis, storage, etc.). Destination device 106 may receive bitstream 110 from source device 102 via a storage medium or transmission medium 104. Source device 102 and destination device 106 may include any quantity (e.g., number) of different devices. Source device 102 and destination device 106 may include, for example, cluster of interconnected computer systems acting as a pool of seamless resources (also referred to as a cloud of computers or cloud computer), a server, a desktop computer, a laptop computer, a tablet computer, a smart phone, a wearable device, a television, a camera, a video gaming console, a set-top box, a video streaming device, a vehicle (e.g., an autonomous vehicle), or a head-mounted display. A head-mounted display may allow a user to view a VR, AR, or MR scene and adjust the view of the scene based on movement of the user's head. A head-mounted display may be tethered to a processing device (e.g., a server, a desktop computer, a set-top box, or a video gaming counsel) or may be fully self-contained.

Source device 102 may comprise a point cloud source 112, an encoder 114, and an output interface 116. To encode point cloud sequence 108 into bitstream 110, source device 102 may comprise a point cloud source 112, an encoder 114, and an output interface 116. Point cloud source 112 may provide or generate point cloud sequence 108 from a capture of a natural scene and/or a synthetically generated scene. A synthetically generated scene may be a scene comprising computer generated graphics. Point cloud source 112 may comprise one or more point cloud capture devices, a point cloud archive comprising previously captured natural scenes and/or synthetically generated scenes, a point cloud feed interface to receive captured natural scenes and/or synthetically generated scenes from a point cloud content provider, and/or a processor(s) to generate synthetic point cloud scenes. The point cloud capture devices may include, for example, one or more laser scanning devices, structured light scanning devices, modulated light scanning devices, and/or passive scanning devices.

As shown in FIG. 1, a point cloud sequence 108 may comprise a series of point cloud frames 124. A point cloud frame may describe an object or scene captured at a particular time instance. Point cloud sequence 108 may achieve the impression of motion by using a constant or variable time to successively present point cloud frames 124 of point cloud sequence 108. A point cloud frame may comprise a collection of points (e.g., voxels) 126 in 3D space. Each point 126 may comprise geometry information that indicates the point's position in 3D space. The geometry information may indicate, for example, the point's position in 3D space using three Cartesian coordinates (x, y, and z). One or more of points 126 may further comprise one or more types of attribute information. Attribute information may indicate a property of a point's visual appearance. Attribute information may indicate, for example, a texture (e.g., color) of a point, a material type of a point, transparency information of a point, reflectance information of a point, a normal vector to a surface of a point, a velocity at a point, an acceleration at a point, a time stamp indicating when a point was captured, a modality indicating how a point was captured (e.g., running, walking, or flying). One or more of points 126 may comprise, for example, light field data in the form of multiple view-dependent texture information. Light field data may be another type of optional attribute information. Color attribute information of one or more of points 126 may comprise a luminance value and two chrominance values. The luminance value may represent the brightness (e.g., luma component, Y) of the point. The chrominance values may respectively represent the blue and red components of the point (e.g., chroma components, Cb and Cr) separate from the brightness. Other color attribute values may be represented based on different color schemes (e.g., an RGB or monochrome color scheme).

Encoder 114 may encode point cloud sequence 108 into bitstream 110. To encode point cloud sequence 108, encoder 114 may use one or more lossless or lossy compression techniques to reduce redundant information in point cloud sequence 108. To encode point cloud sequence 108, encoder 114 may use one or more prediction techniques to reduce redundant information in point cloud sequence 108. Redundant information is information that may be predicted at a decoder 120 and therefore may not be needed to be sent (e.g., transmitted) to decoder 120 for accurate decoding of point cloud sequence 108. For example, Motion Picture Expert Group (MPEG) introduced a geometry-based point cloud compression (G-PCC) standard (ISO/IEC standard 23090-9: Geometry-based point cloud compression). G-PCC specifies the encoded bitstream syntax and semantics for transmission and/or storage of a compressed point cloud frame and the decoder operation for reconstructing the compressed point cloud frame from the bitstream. During standardization of G-PCC, a reference software (ISO/IEC standard 23090-21: Reference Software for G-PCC) was developed to encode the geometry and attribute information of a point cloud frame. To encode geometry information of a point cloud frame, the G-PCC reference software encoder may perform voxelization. The G-PCC reference software encoder may perform voxelization, for example, by quantizing positions of points in a point cloud. Quantizing positions of points in a point cloud may create a grid in 3D space. The G-PCC reference software encoder may map the points to the center coordinates of the sub-grid volume (e.g., voxel) that their quantized locations reside in. The G-PCC reference software encoder may perform geometry analysis using an occupancy tree to compress the geometry information. The G-PCC reference software encoder may entropy encode the result of the geometry analysis to further compress the geometry information. To encode attribute information of a point cloud, the G-PCC reference software encoder may use a transform tool, such as Region Adaptive Hierarchical Transform (RAHT), the Predicting Transform, and/or the Lifting Transform. The Lifting Transform may be built on top of the Predicting Transform. The Lifting Transform may include an extra update/lifting step. The Lifting Transform and the Predicting Transform may be referred to as Predicting/Lifting Transform or pred lift. Encoder 114 may operate in a same or similar manner to an encoder provided by the G-PCC reference software.

Output interface 116 may be configured to write and/or store bitstream 110 onto transmission medium 104. The bitstream 110 may be sent (e.g., transmitted) to destination device 106. In addition or alternatively, output interface 116 may be configured to send (e.g., transmit), upload, and/or stream bitstream 110 to destination device 106 via transmission medium 104. Output interface 116 may comprise a wired and/or wireless transmitter configured to send (e.g., transmit), upload, and/or stream bitstream 110 according to one or more proprietary and/or standardized communication protocols. The one or more proprietary and/or standardized communication protocols may include, for example, Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. Transmission medium 104 may comprise, for example, one or more wires, cables, air interfaces, optical discs, flash memory, and/or magnetic memory. In addition, or alternatively, transmission medium 104 may comprise one or more networks (e.g., the Internet) or file server(s) configured to store and/or send (e.g., transmit) encoded video data (e.g., bitstream 110).

Destination device 106 may comprise an input interface 118, a decoder 120, and a point cloud display 122. To decode bitstream 110 into point cloud sequence 108 for display or other forms of consumption, destination device 106 may comprise an input interface 118, a decoder 120, and a point cloud display 122. Input interface 118 may be configured to read bitstream 110 stored on transmission medium 104. Bitstream 110 may be stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Decoder 120 may decode point cloud sequence 108 from encoded bitstream 110. Decoder 120 may operate, for example, in a same or similar manner as a decoder provided by G-PCC reference software. Decoder 120 may decode a point cloud sequence that approximates point cloud sequence 108. Decoder 120 may decode a point cloud sequence that approximates point cloud sequence 108 due to, for example, lossy compression of point cloud sequence 108 by encoder 114 and/or errors introduced into encoded bitstream 110, for example, if transmission to destination device 106 occurs.

Point cloud display 122 may display point cloud sequence 108 to a user. Point cloud display 122 may comprise, for example, a cathode rate tube (CRT) display, a liquid crystal display (LCD), a plasma display, a light emitting diode (LED) display, a 3D display, a holographic display, a head-mounted display, or any other display device suitable for displaying point cloud sequence 108.

Point cloud coding/decoding system 100 is presented by way of example and not limitation. In the example of FIG. 1, point cloud coding/decoding system 100 may have other components and/or arrangements. Point cloud source 112 may, for example, be external to source device 102. Point cloud display device 122 may, for example, be external to destination device 106 or omitted altogether where point cloud sequence is intended for consumption by a machine and/or storage device. Source device 102 may further comprise, for example, a point cloud decoder. Destination device 104 may comprise, for example, a point cloud encoder. Source device 102 may be configured to further receive an encoded bit stream from destination device 106. Receiving an encoded bit stream from destination device 106 may support two-way point cloud transmission between the devices.

As described herein, an encoder may quantize the positions of points in a point cloud according to a space precision, which may be the same or different in each dimension of the points. The quantization process may create a grid in 3D space. The encoder may map any points residing within each sub-grid volume to the sub-grid center coordinates, referred to as a voxel. A voxel may be considered as a 3D extension of pixels corresponding to 2D image grid coordinates.

The encoder may represent or code the voxelized point cloud. The encoder may represent or code the voxelized point cloud, for example, using an occupancy tree. The encoder may split the initial volume or cuboid containing the voxelized point cloud into sub-cuboids. The initial volume or cuboid may be referred to as a bounding box. A cuboid may be, for example, a cube. The encoder may recursively split each sub-cuboid that contains at least one point of the point cloud. The encoder may not further split sub-cuboids that do not contain at least one point of the point cloud. A sub-cuboid that contains at least one point of the point cloud may be referred to as an occupied sub-cuboid. A sub-cuboid that does not contain at least one point of the point cloud may be referred to as an unoccupied sub-cuboid. The encoder may split an occupied cuboid into, for example, two sub-cuboids (to form a binary tree), four sub-cuboids (to form a quadtree), or eight sub-cuboids (to form an octree). The encoder may split an occupied cuboid to obtain sub-cuboids. The sub-cuboids may have the same size and shape at a given depth level of the occupancy tree. The sub-cuboids may have the same size and shape at a given depth level of the occupancy tree, for example, if the encoder splits the occupied cuboid along a plane passing through the middle of edges of the cuboid.

The initial volume or cuboid containing the voxelized point cloud may correspond to the root node of the occupancy tree. Each occupied sub-cuboid, split from the initial volume, may correspond to a node (of the root node) in a second level of the occupancy tree. Each occupied sub-cuboid, split from an occupied sub-cuboid in the second level, may correspond to a node (off the occupied sub-cuboid in the second level from which it was split) in a third level of the occupancy tree. The occupancy tree structure may continue to form in this manner for each recursive split iteration until, for example, some maximum depth level of the occupancy tree is reached or each occupied sub-cuboid has a volume corresponding to one voxel.

Each non-leaf node of the occupancy tree may comprise or be associated with an occupancy word representing the occupancy state of the cuboid corresponding to the node. A node of the occupancy tree corresponding to a cuboid that is split into 8 sub-cuboids may comprise or be associated with a 1-byte occupancy word. Each bit (referred to as an occupancy bit) of the 1-byte occupancy word may represent or indicate the occupancy of a different one of the eight sub-cuboids. Occupied sub-cuboids may be each represented or indicated by a binary "1" in the 1-byte occupancy word. Unoccupied sub-cuboids may be each represented or indicated by a binary "0" in the 1-byte occupancy word. Occupied and un-occupied sub-cuboids may be represented or indicated by opposite 1-bit binary values (e.g., a binary "0" representing or indicating an occupied sub-cuboid and a binary "1" representing or indicating an unoccupied sub-cuboid) in the 1-byte occupancy word.

Each bit of an occupancy word may represent or indicate the occupancy of a different one of the eight sub-cuboids. Each bit of an occupancy word may represent or indicate the occupancy of a different one of the eight sub-cuboids, for example, following the so-called Morton order. The least significant bit of an occupancy word may represent or indicate, for example, the occupancy of a first one of the eight sub-cuboids following the Morton order. The second least significant bit of an occupancy word may represent or indicate, for example, the occupancy of a second one of the eight sub-cuboids following the Morton order, etc.

Figure 2:
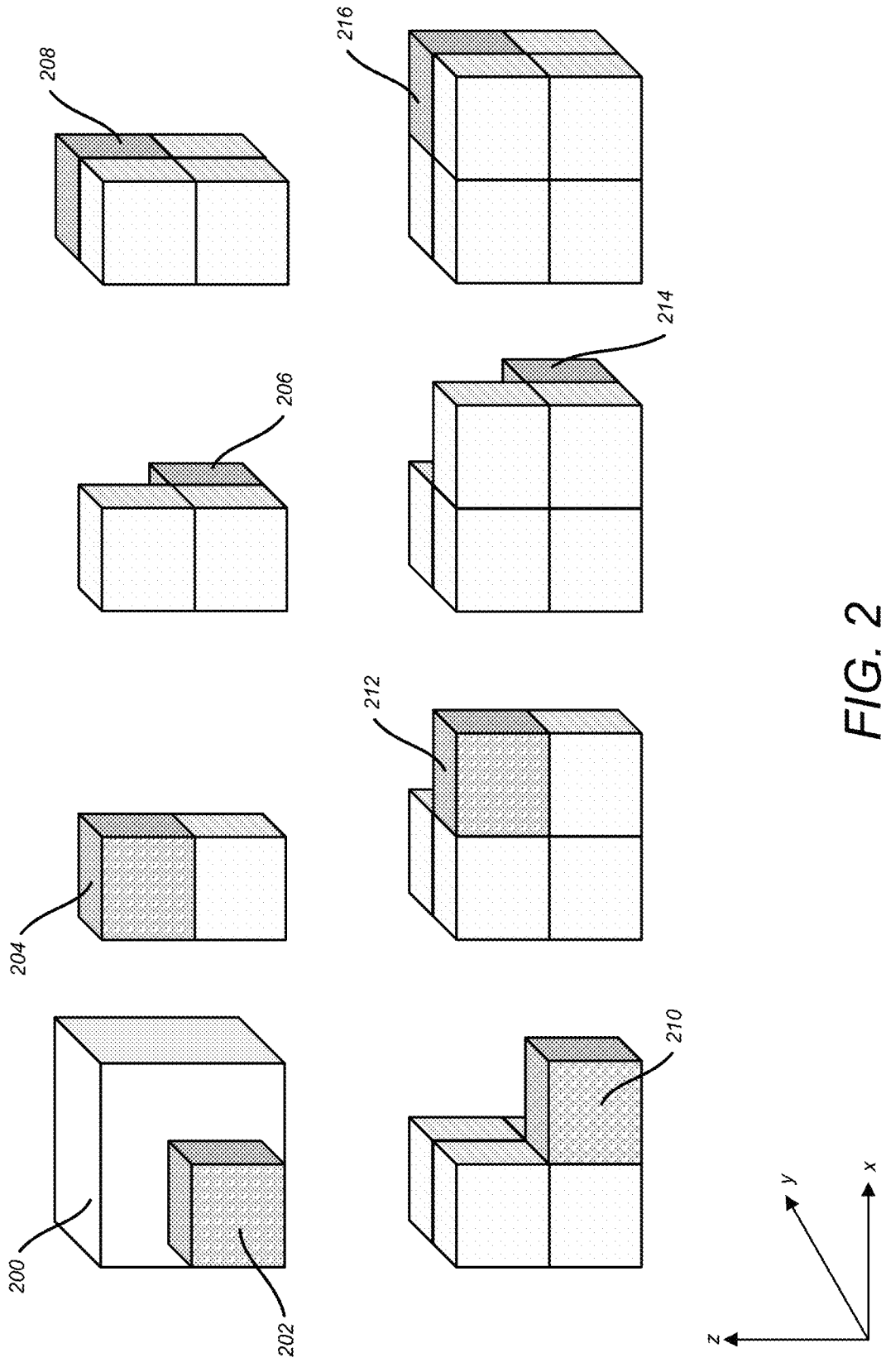
FIG. 2 shows a Morton order of eight sub-cuboids split from a cuboid.

FIG. 2 shows a Morton order of eight sub-cuboids (e.g., sub-cuboids 202-216) split from a cuboid (e.g., cuboid 200). Sub-cuboids 202-216 are labeled based on their Morton order, with child node 202 being the first in Morton order and child node 216 being the last in Morton order. The Morton order for sub-cuboids 202-216 is a local lexico-graphic order in xyz.

The geometry of the voxelized point cloud is represented by, and may be determined from, the initial volume and the occupancy words of the nodes in the occupancy tree. The encoder may send (e.g., transmit) the initial volume and the occupancy words of the nodes in the occupancy tree in a bitstream to a decoder for reconstructing the point cloud. The encoder may entropy encode the occupancy words. The encoder may entropy encode the occupancy words, for example, before sending the initial volume and the occu-pancy words of the nodes in the occupancy tree. The encoder may encode an occupancy bit of an occupancy word of a node corresponding to a cuboid. The encoder may encode an occupancy bit of an occupancy word of a node correspond-ing to a cuboid, for example, based on one or more occu-pancy bits of occupancy words of other nodes corresponding to cuboids that are adjacent or spatially close to the cuboid of the occupancy bit being encoded.

An encoder and/or decoder may code occupancy bits of occupancy words in sequence of a scan order. The scan order may also be referred to as a scanning order. An encoder and/or decoder may scan an occupancy tree in breadth-first order. All the occupancy words of the nodes of a given depth (e.g., level) within the occupancy tree may be scanned. All the occupancy words of the nodes of a given depth (e.g., level) within the occupancy tree may be scanned, for example, before scanning the occupancy words of the nodes of the next depth (e.g., level). Within a given depth, the encoder and/or decoder may scan the occupancy words of nodes in the Morton order. Within a given node, the encoder and/or decoder may scan the occupancy bits of the occu-pancy word of the node further in the Morton order.

Figure 3:
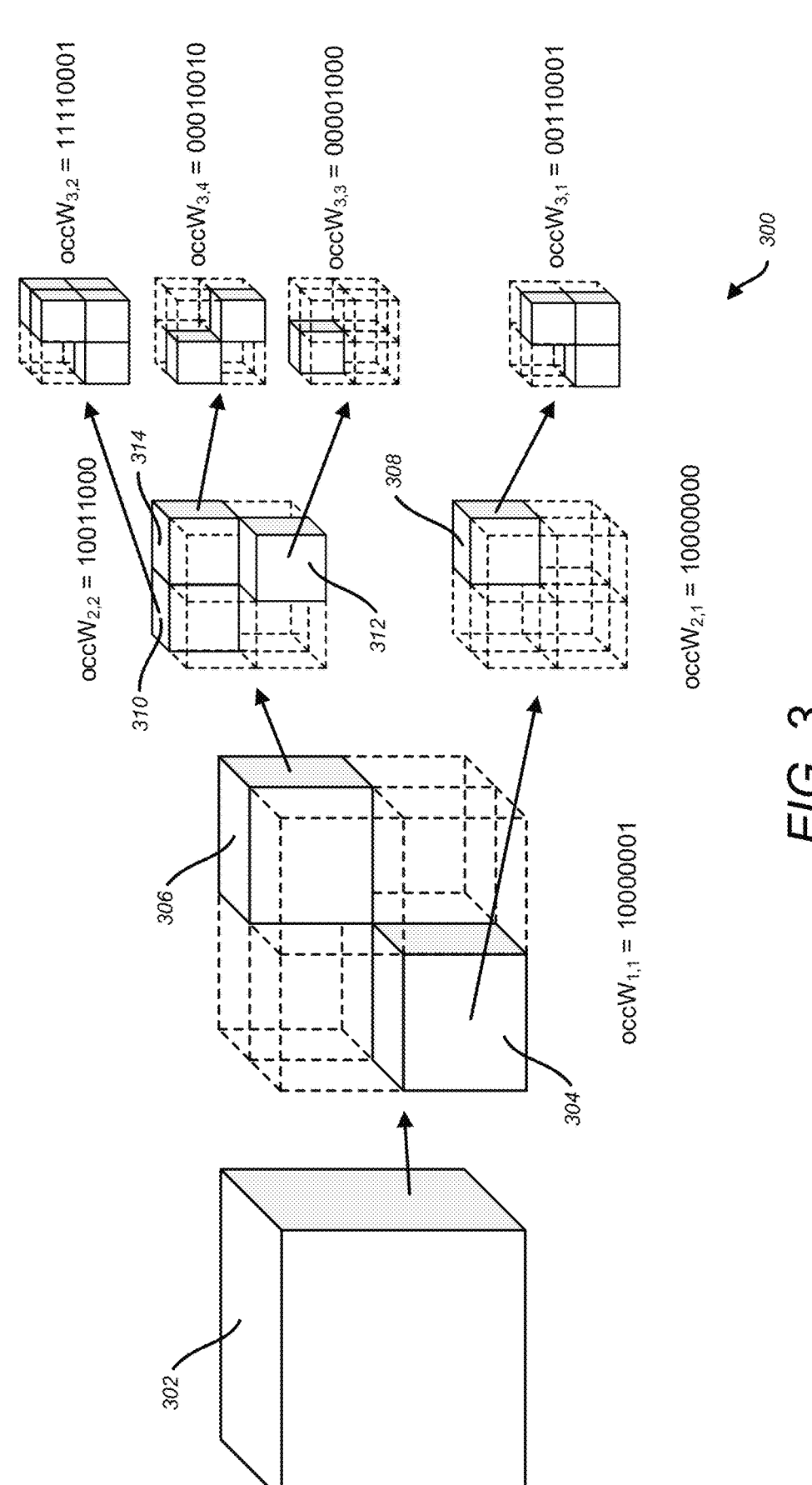
FIG. 3 shows an example of a scanning order for an occupancy tree.

FIG. 3 shows an example of a scanning order (e.g., breadth-first order as described herein) for an occupancy tree (e.g., an occupancy tree 300). FIG. 3 shows a scanning order for the first three example levels of occupancy tree 300. In FIG. 3, a cuboid 302 corresponding to the root node of occupancy tree 300 may be divided into eight sub-cuboids. Two sub-cuboids 304 and 306 of the eight sub-cuboids may be occupied. The other six sub-cuboids of the eight sub-cuboids may be unoccupied. Following the Morton order, a first eight-bit occupancy word $occW_{1,1}$ is constructed to represent the occupancy word of the root node. The least significant occupancy bit of the first eight-bit occupancy word $occW_{1,1}$ represents or indicates the occupancy of the first sub-cuboid of the eight sub-cuboids in Morton order. The second least significant occupancy bit of the first eight-bit occupancy word $occW_{1,1}$ represents or indicates the occupancy of the second sub-cuboid of the eight sub-cuboids in Morton order, etc.

Each of the two occupied sub-cuboids 304 and 306 corresponds to a node off the root node in a second level of occupancy tree 300. The two occupied sub-cuboids 304 and 306 are each further split into eight sub-cuboids. One of the sub-cuboids 308 of the eight sub-cuboids split from sub-cuboid 304 may be occupied. The other seven sub-cuboids of the eight sub-cuboids split from sub-cuboid 304 may be unoccupied. Three of the sub-cuboids 310, 312, and 314 of the eight sub-cuboids split from sub-cuboid 306 may be occupied. The other five sub-cuboids of the eight sub-cuboids split from sub-cuboid 306 may be unoccupied. Two second eight-bit occupancy words $occW_{2,1}$ and $occW_{2,2}$ are constructed in this order to respectively represent the occu-pancy word of the node corresponding to sub-cuboid 304 and the occupancy word of the node corresponding to sub-cuboid 306.

Each of the four occupied sub-cuboids 308, 310, 312, and 314 corresponds to a node in a third level of occupancy tree 300. The four occupied sub-cuboids 308, 310, 312, and 314 are each further split into eight sub-cuboids or 32 sub-cuboids in total. Four third level eight-bit occupancy words $occW_{3,1}$, $occW_{3,2}$, $occW_{3,3}$ and $occW_{3,4}$ are constructed in this order to respectively represent the occupancy word of the node corresponding to sub-cuboid 308, the occupancy word of the node corresponding to sub-cuboid 310, the occupancy word of the node corresponding to sub-cuboid 312, and the occupancy word of the node corresponding to sub-cuboid 314.

The occupancy words of occupancy tree 300 may be entropy coded (e.g., entropy encoded by an encoder and entropy decoded by a decoder) as the succession of the seven occupancy words $occW_{1,1}$ to $occW_{3,4}$, for example, follow-ing the scanning order (e.g., breadth-first order) as described herein. As a consequence of the breadth-first scanning order, the occupancy word(s) of all node(s) having the same depth (e.g., level) as a current parent node may have already been entropy coded, for example, if the occupancy word of a current child node belonging to the current parent node is being entropy coded. The occupancy word(s) of all node(s) having the same depth (e.g., level) as the current child node and having a lower Morton order than the current child node may have also already been entropy coded, for example, if the occupancy word for the current child node is being entropy coded. Part of the already coded occupancy word(s) may be used to entropy code the occupancy word of the current child node. The already coded occupancy word(s) of neighboring parent and/or child node(s) may be used, for example, to entropy code the occupancy word of the current child node. The occupancy bit(s) of the occupancy word having a lower Morton order than a particular occupancy bit of the occupancy word of the current child node may have also already been entropy coded. The occupancy bit(s) of the occupancy word having a lower Morton order than a par-ticular occupancy bit may be used to code the occupancy bit of the occupancy word of the current child node, for example, if the particular occupancy bit is being coded.

Figure 4:
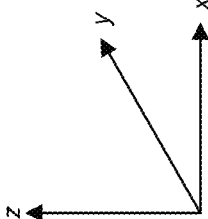
FIG. 4 shows an example neighborhood of cuboids for entropy coding the occupancy of a child cuboid.

FIG. 4 shows an example neighborhood of cuboids for entropy coding the occupancy of a child cuboid. A neigh-borhood of cuboids with already-coded occupancy bits may be used to entropy code the occupancy bit of a current child cuboid 400. The neighborhood of cuboids with already-coded occupancy bits may be determined. The neighbor-hood of cuboids with already-coded occupancy bits may be determined, for example, based on the scanning order of an occupancy tree representing the geometry of the cuboids in FIG. 4 as described herein. The neighborhood of cuboids, of a current child cuboid, may include one or more of: a cuboid adjacent to the current child cuboid, a cuboid sharing a vertex with the current child cuboid, a cuboid sharing an edge with the current child cuboid, a cuboid sharing a face with the current child cuboid, a parent cuboid adjacent to the current child cuboid, a parent cuboid sharing a vertex with the current child cuboid, a parent cuboid sharing an edge with the current child cuboid, a parent cuboid sharing a face with the current child cuboid, a parent cuboid adjacent to the current parent cuboid, a parent cuboid sharing a vertex with the current parent cuboid, a parent cuboid sharing an edge with the current parent cuboid, a parent cuboid sharing a face with the current parent cuboid, etc. As shown in FIG. 4, current child cuboid 400 may belong to a current parent cuboid 402. Following the scanning order of the occupancy words and occupancy bits of nodes of the occupancy tree, the occupancy bits of four child cuboids 404, 406, 408, and 410, belonging to the same current parent cuboid 402, have already been coded. The occupancy bits of child cuboids 412 of preceding parent cuboids have already been coded. The occupancy bits of parent cuboids 414, for which the occupancy bits of child cuboids have not already been coded, have already been coded. Therefore, the already-coded occupancy bits of cuboids 404, 406, 408, 410, 412, and 414 may be used to code the occupancy bit of the current child cuboid 400.

The number (e.g., quantity) of possible occupancy configurations (e.g., sets of one or more occupancy words and/or occupancy bits) for a neighborhood of a current child cuboid may be $2^N$, where N is the number (e.g., quantity) of cuboids in the neighborhood of the current child cuboid with already-coded occupancy bits. The neighborhood of the current child cuboid may comprise several dozens of cuboids. The neighborhood of the current child cuboid may comprise the 26 adjacent parent cuboids sharing a face, an, edge, and/or a vertex with the parent cuboid of the current child cuboid and also several adjacent child cuboids sharing a face, an edge, and/or a vertex with the current child cuboid. The occupancy configuration for a neighborhood of the current child cuboid may have billions of possible occupancy configurations, even limited to a subset of the adjacent cuboids, making its direct use impractical. An encoder and/or decoder may use the occupancy configuration for a neighborhood of the current child cuboid to select the context (e.g., a probability model), among a set of contexts, of a binary entropy coder (e.g., binary arithmetic coder) that codes the occupancy bit of the current child cuboid. The context-based binary entropy coding may be similar to the Context Adaptive Binary Arithmetic Coder (CABAC) used in MPEG-H Part 2 (also known as High Efficiency Video Coding (HEVC)).

An encoder and/or decoder may use several methods to reduce the occupancy configurations for a neighborhood of a current child cuboid being coded to a practical number (e.g., quantity) of reduced occupancy configurations. The $2^6$ or 64 occupancy configurations of the six adjacent parent cuboids sharing a face with the parent cuboid of the current child cuboid may be reduced to nine occupancy configurations. The occupancy configurations may be reduced by using geometry invariance. An occupancy score for the current child cuboid may be obtained from the $2^{26}$ occupancy configurations of the 26 adjacent parent cuboids. The score may be further reduced into a ternary occupancy prediction (e.g., "predicted occupied," "unsure," or "predicted unoccupied") by using score thresholds. The number (e.g., quantity) of occupied adjacent child cuboids and the number (e.g., quantity) of unoccupied adjacent child cuboids may be used instead of the individual occupancies of these child cuboids.

An encoder and/or decoder may reduce the number (e.g., quantity) of possible occupancy configurations for a neighborhood of a current child cuboid to a more manageable number (e.g., a few thousands). It has been observed that instead of associating a reduced number (e.g., quantity) of contexts (e.g., probability models) directly to the reduced occupancy configurations, another mechanism may be used, namely Optimal Binary Coders with Update on the Fly (OBUF). An encoder and/or decoder may implement OBUF to limit the number (e.g., quantity) of contexts to a lower number (e.g., 32 contexts).

OBUF may use a limited number (e.g., 32) of contexts (e.g., probability models). The number (e.g., quantity) of contexts in OBUF may be a fixed number (e.g., fixed quantity). The contexts used by OBUF may be ordered, referred to by a context index (e.g., a context index in the range of 0 to 31), and associated from a lowest virtual probability to a highest virtual probability to code a "1." A Look-Up Table (LUT) of context indices may be initialized at the beginning of a point cloud coding process. The LUT may initially point to a context with the median virtual probability to code a "1" for all input. The LUT may initially point to a context with the median virtual probability to code a "1," among the limited number (e.g., quantity) of contexts, for all input. This LUT may take an occupancy configuration for a neighborhood of current child cuboid as input and output the context index associated with the occupancy configuration. The LUT may have as many entries as reduced occupancy configurations (e.g., around a few thousand entries). The coding of the occupancy bit of a current child cuboid may comprise the steps of determining the reduced occupancy configuration of the current child node, obtaining a context index by using the reduced occupancy configuration as an entry to the LUT, coding the occupancy bit of the current child cuboid by using the context pointed to (e.g., indicated) by the context index, and updating the LUT entry corresponding to the reduced occupancy configuration. The LUT entry may be updated, for example, based on the value of the coded occupancy bit of the current child cuboid. For a binary "0" (e.g., indicating the current child cuboid is unoccupied) being coded, the LUT entry may be decreased to a lower context index value (e.g., associated with a lower virtual probability). For a binary "1" (e.g., indicating the current child cuboid is occupied) being coded, the LUT entry may be increased to a higher context index value (e.g., associated with a higher virtual probability). The update process of the context index may be based on a theoretical model of optimal distribution for virtual probabilities associated with the limited number (e.g., quantity) of contexts. This virtual probability may be fixed by a model. This virtual probability may be different from the internal probability of the context that evolves during the coding of bits of data. The evolution of the internal context may follow a well-known process similar to the process in CABAC.

An encoder and/or decoder may implement a "dynamic OBUF" scheme. The "dynamic OBUF" scheme may handle a much larger number (e.g., quantity) of occupancy configurations for a neighborhood of a current child cuboid than general OBUF. The use of a larger number (e.g., quantity) of occupancy configurations for a neighborhood of a current child cuboid may lead to improved compression capabilities. The use of a larger number (e.g., quantity) of occupancy configurations for a neighborhood of a current child cuboid may also maintain complexity within reasonable bounds. By using an occupancy tree compressed by OBUF, an encoder and/or decoder may reach a lossless compression performance as good as 1 bit per point (bpp) for coding the geometry of dense point clouds. An encoder and/or decoder may implement dynamic OBUF to potentially further reduce the bit rate by more than 25% to 0.7 bpp.

OBUF may not take as input a large variety of reduced occupancy configurations for a neighborhood of a current child cuboid. This may potentially lead to a loss of useful correlation. With OBUF, the size of the LUT of context indices may be increased to handle more various occupancy configurations for a neighborhood of a current child cuboid as input. By doing so, statistics may be diluted, and compression performance may be worsened. For example, if the LUT has millions of entries and the point cloud has a hundred thousand points, then most of the entries are never visited (e.g., looked up, accessed, etc.). In some instances, many entries may be visited only a few times and their associated context index may not be updated enough times to reflect any meaningful correlation between the occupancy configuration value and the probability of occupancy of the current child cuboid. Dynamic OBUF may be implemented to mitigate the dilution of statistics due to the increase of the number (e.g., quantity) of occupancy configurations for a neighborhood of a current child cuboid. This mitigation is performed by a "dynamic reduction" of occupancy configurations in dynamic OBUF.

Dynamic OBUF may add an extra step of reduction of occupancy configurations for a neighborhood of a current child cuboid. Dynamic OBUF may add an extra step of reduction of occupancy configurations for a neighborhood of a current child cuboid, for example, before using the LUT of context indices. This step may be called a dynamic reduction because it evolves based on the progress of the coding of the point cloud or, more precisely, based on already visited (e.g., looked up in the LUT) occupancy configurations.

As described herein, many possible occupancy configurations for a neighborhood of a current child cuboid are potentially involved but only a subset may be visited, for example, if the coding of a point cloud occurs. This subset of visited occupancy configurations may characterize the type of the point cloud. For example, most of the visited occupancy configurations may exhibit occupied adjacent cuboids of a current child cuboid, for example, if AR or VR dense point clouds are being coded. On the other hand, most of the visited occupancy configurations may exhibit only a few occupied adjacent cuboids of a current child cuboid, for example, if sensor-acquired sparse point clouds are being coded. The role of the dynamic reduction may be to obtain a more precise correlation based on the most visited occupancy configuration, for example, by putting aside (e.g., reducing aggressively) other occupancy configurations that are much less visited. The dynamic reduction may be updated on-the-fly. The dynamic reduction may be updated on-the-fly. The dynamic reduction may be updated on-the-fly, for example, after each visit (e.g., a lookup in the LUT) of an occupancy configuration. A visit (e.g., a lookup in the LUT) of an occupancy configuration may occur, for example, if the coding of occupancy data occurs.

Figure 5:
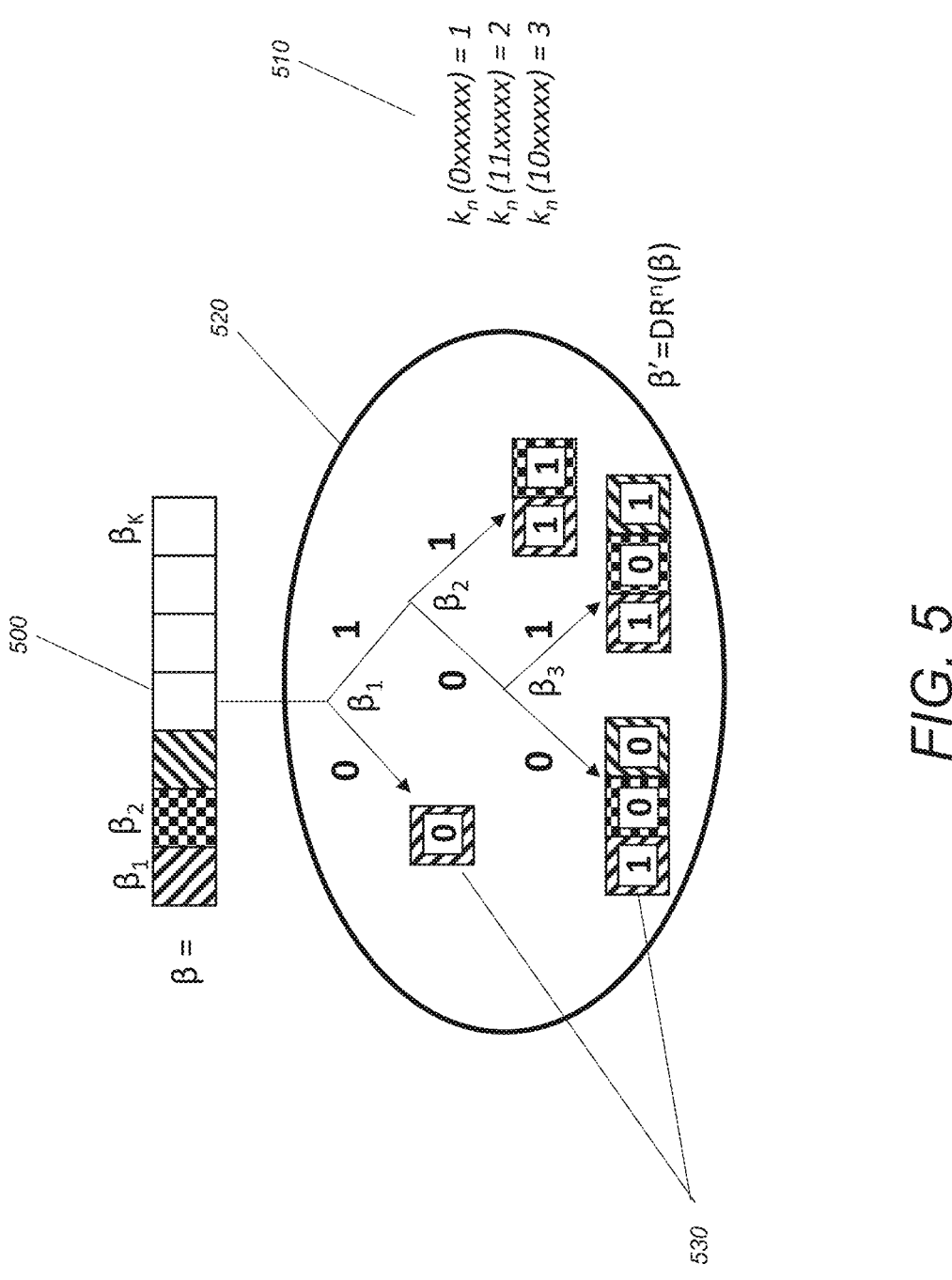
FIG. 5 shows an example of a dynamic reduction function (DR) that may be used in dynamic OBUF.

FIG. 5 shows an example of a dynamic reduction function (DR) that may be used in dynamic OBUF. The dynamic reduction function (DR) may be obtained by masking bits $\beta_j$ of occupancy configurations 500, $$\beta = \beta_1 \ldots \beta_K,$$

made of K bits. The size of the mask may decrease, for example, if occupancy configurations are visited (e.g., looked up in the LUT) a certain number (e.g., quantity) of times. The initial dynamic reduction function $DR^0$ may mask all bits for all occupancy configurations such that it is a constant function $DR^0(\beta)=0$ for all occupancy configurations $\beta$. The dynamic reduction function may evolve from a function $DR^n$ to an updated function $DR^{n+1}$. The dynamic reduction function may evolve from a function $DR^n$ to an updated function $DR^{n+1}$, for example, after each coding of an occupancy bit. The function may be defined by $$\beta' = DR^n(\beta) = \beta_1 \ldots \beta_{kn(\beta)},$$

where $k_n(\beta)$ 510 is the number (e.g., quantity) of non-masked bits. The initialization of $DR^0$ may correspond to $k_0(\beta)=0$, and the natural evolution of the reduction function toward finer statistics may lead to an increasing number (e.g., quantity) of non-masked bits $k_n(\beta) \le k_{n+1}(\beta)$. The dynamic reduction function may be entirely determined by the values of $k_n$ for all occupancy configurations $\beta$.

The visits (e.g., instances of a lookup in the LUT) to occupancy configurations may be tracked by a variable $NV(\beta')$ for all dynamically reduced occupancy configurations $\beta'=DR^n(\beta)$. The corresponding number (e.g., quantity) of visits $NV(\beta^{V'})$ may be increased by one. The corresponding number (e.g., quantity) of visits $NV(\beta^{V'})$ may be increased by one, for example, after each instance of coding of an occupancy bit based on an occupancy configuration $\beta^V$. If this number (e.g., quantity) of visits $NV(\beta^{V'})$ is greater than a threshold $th_V$, $$NV(\beta^{V'}) > th_V,$$

then the number (e.g., quantity) of unmasked bits $k_n(\beta)$ may be increased by one for all occupancy configurations $\beta$ being dynamically reduced to $\beta^{V'}$. This corresponds to replacing the dynamically reduced occupancy configuration $\beta^{V'}$ by the two new dynamically reduced occupancy configurations $\beta^{0'}$ and $\beta^{1'}$ defined by $$\beta^{0'} = \beta^{V'}0 = \beta_1^V \ldots \beta_{kn(\beta)}^V 0, \text{ and } \beta^{1'} = \beta^{V'}1 = \beta_1^V \ldots \beta_{kn(\beta)}^V 1.$$

In other words, the number (e.g., quantity) of unmasked bits has been increased by one $k_{n+1}(\beta)=k_n(\beta)+1$ for all occupancy configurations $\beta$ such that $DR^n(\beta)=\beta^{V'}$. The number (e.g., quantity) of visits of the two new dynamically reduced occupancy configurations may be initialized to zero, $$NV(\beta^{0'}) = NV(\beta^{1'}) = 0. \tag{I}$$

At the start of the coding, the initial number (e.g., quantity) of visits for the initial dynamic reduction function $DR^0$ may be set to $$NV(DR^0(\beta)) = NV(0) = 0,$$

and the evolution of NV on dynamically reduced occupancy configurations may be entirely defined.

The corresponding LUT entry $LUT[\beta^{V'}]$ may be replaced by the two new entries $LUT[\beta^{0'}]$ and $LUT[\beta^{1'}]$ that are initialized by the coder index associated with $\beta^{V'}$. The corresponding LUT entry $LUT[\beta^{V'}]$ may be replaced by the two new entries $LUT[\beta^{0'}]$ and $LUT[\beta^{1'}]$ that are initialized by the coder index associated with $\beta^{V'}$, for example, if a dynamically reduced occupancy configuration $\beta^{V_i}$ is replaced by the two new dynamically reduced occupancy configurations $\beta^{0_i}$ and $\beta^{1_i}$, $$LUT[\beta^{0_i}] = LUT[\beta^{1_i}] = LUT[\beta^{V_i}], \qquad \text{(II)}$$

and then evolve separately. The evolution of the LUT of coder indices on dynamically reduced occupancy configurations may be entirely defined.

The reduction function $DR^n$ may be modeled by a series of growing binary trees $T^n$ 520 whose leaf nodes 530 are the reduced occupancy configurations $\beta'=DR^n(\beta)$. The initial tree may be the single root node associated with $0=DR^0(\beta)$. The replacement of the dynamically reduced to $\beta^{V_i}$ by $\beta^{0_i}$ and $\beta^{1_i}$ corresponds to growing the tree $T^n$ from the leaf node associated with $\beta^{V_i}$. The replacement of the dynamically reduced to $\beta^{V_i}$ by $\beta^{0_i}$ and $\beta^{1_i}$ corresponds to growing the tree $T^n$ from the leaf node associated with $\beta^{V_i}$, for example, by attaching to it two new nodes associated with $\beta^{0_i}$ and $\beta^{1_i}$. The tree $T^{n+1}$ may be obtained by this growth. The number (e.g., quantity) of visits NV and the LUT of context indices may be defined on the leaf nodes and evolve with the growth of the tree through equations (I) and (II).

The practical implementation of dynamic OBUF may be made by the storage of the array NV[$\beta'$] and the LUT[$\beta'$] of context indices, as well as the trees $T^n$ 520. An alternative to the storage of the trees may be to store the array $k_n[\beta]$ 510 of the number (e.g., quantity) of non-masked bits.

A limitation for implementing dynamic OBUF may be its memory footprint. In some instances, a few million occupancy configurations may be practically handled, leading to about 20 bits $\beta_i$ constituting an entry configuration $\beta$ to the reduction function DR. Each bit $\beta_i$ may correspond to the occupancy status of a neighboring cuboid of a current child cuboid or a set of neighboring cuboids of a current child cuboid.

Higher (e.g., more significant) bits $\beta_i$ (e.g., $\beta_0$, $\beta_1$, etc.) may be the first bits to be unmasked. Higher (e.g., more significant) bits $\beta_i$ (e.g., $\beta_0$, $\beta_1$, etc.) may be the first bits to be unmasked, for example, during the evolution of the dynamic reduction function DR. The order of neighbor-based information put in the bits $\beta_i$ may impact the compression performance. Neighboring information may be ordered from higher priority to lower priority and put, in this order, into the bits $\beta_i$, e.g., from higher to lower weight. The priority may be, from the most important to the least important, occupancy of sets of adjacent neighboring child cuboids, then occupancy of adjacent neighboring child cuboids, then occupancy of adjacent neighboring parent cuboids, then occupancy of non-adjacent neighboring child nodes, and finally occupancy of non-adjacent neighboring parent nodes. Adjacent nodes sharing a face with the current child node may also have higher priority than adjacent nodes sharing an edge (but not sharing a face) with the current child node. Adjacent nodes sharing an edge with the current child node may have higher priority than adjacent nodes sharing only a vertex with the current child node.

Figure 6:
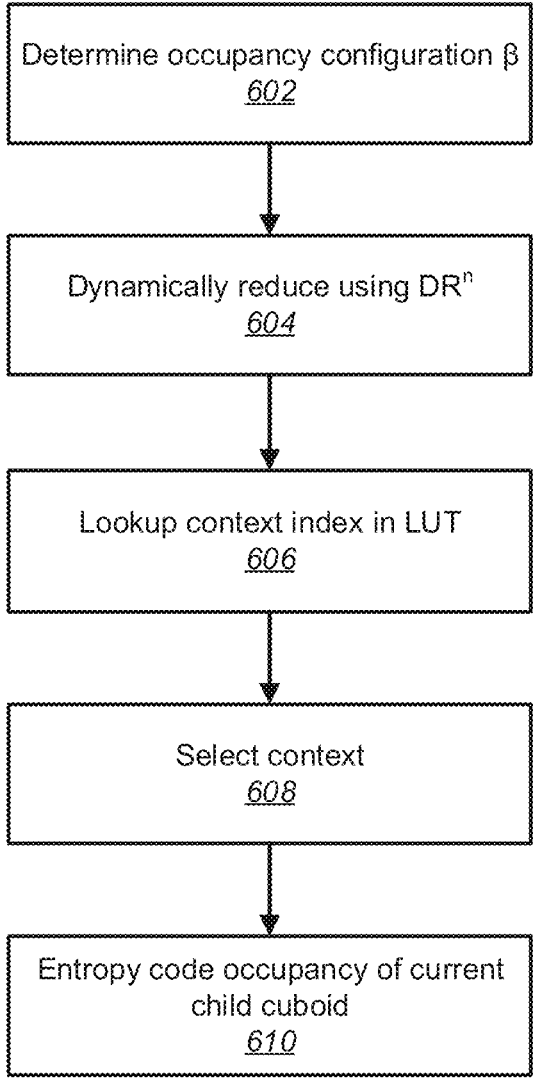
FIG. 6 shows an example method for coding occupancy of a cuboid using dynamic OBUF.

FIG. 6 shows an example method for coding occupancy of a cuboid using dynamic OBUF. More specifically, FIG. 6 shows a flowchart of an example method for coding occupancy (e.g., as indicated by a single bit) of a current child cuboid using dynamic OBUF. More specifically, FIG. 6 shows a flowchart of example method steps coding occupancy of a current child cuboid using dynamic OBUF. The example method, or one or more operations of the method, may be performed by one or more computing devices or entities. For example, all or portions of the flowchart may be implemented by a coder (e.g., encoder 114 in FIG. 1 and/or decoder 120 in FIG. 1), an example computer system 1700 in FIG. 17, and/or an example computing device 1830 in FIG. 18.

At step 602, an encoder and/or decoder may determine the occupancy configuration $\beta$ of the current child cuboid. The encoder and/or decoder may determine the occupancy configuration $\beta$ of the current child cuboid, for example, based on occupancy bits of already-coded cuboids in a neighborhood of the current child cuboid. At step 604, the encoder and/or decoder may dynamically reduce the occupancy configuration $\beta$ into a reduced occupancy configuration $\beta$ using $DR^n$ (e.g., $\beta'=DR^n(\beta)$). At step 606, the encoder and/or decoder may lookup context index LUT[$\beta'$] in the LUT of the dynamic OBUF. At step 608, the encoder and/or decoder may select the context (e.g., probability model) pointed to by the context index. At step 610, the encoder and/or decoder may entropy code (e.g., arithmetic code) the occupancy bit of the current child cuboid based on the context.

Although not shown in FIG. 6, the encoder and/or decoder may further update the reduction function $DR^n$ into $DR^{n+1}$ and/or update the context index LUT[$\beta'$] based on the occupancy bit of the current child cuboid. The method of FIG. 6 may be repeated for additional or all child cuboids of parent cuboids corresponding to nodes of the occupancy tree in a scan order, such as the scan order described herein with respect to FIG. 3.

The occupancy tree is a lossless compression technique. The occupancy tree may be adapted to provide lossy compression, for example, by modifying the point cloud on the encoder side (e.g., down-sampling, removing points, moving points, etc.) but compression performance of the lossy compression may be weak. It may be a useful lossless compression technique for dense point clouds.

An approach to lossy compression for point cloud geometry may be to set the maximum depth of the occupancy tree to not reach the smallest volume size of one voxel. Instead, the maximum depth of the occupancy tree may be set to stop at a bigger volume size (e.g., N×N×N cuboids, where N>1). The geometry of the points belonging to each occupied leaf node associated with the bigger volumes may then be modeled. This approach may be particularly suited for dense and smooth point clouds that may be locally modeled by smooth functions, for example, planes or polynomials. The coding cost may become the cost of the occupancy tree plus the cost of the local model in each of the occupied leaf nodes.

A scheme for modeling the geometry of the points belonging to each occupied leaf node associated with a volume size larger than one voxel may use sets of triangles as local models. The scheme may be referred to as the "TriSoup" scheme. TriSoup is short for "Triangle Soup" because the connectivity between triangles may not be part of the models. An occupied leaf node of an occupancy tree that corresponds to a cuboid with a volume greater than one voxel may be referred to as a TriSoup node. An edge belonging to at least one cuboid corresponding to a TriSoup node may be referred to as a TriSoup edge. A TriSoup node may comprise a presence flag ($s_k$) for each TriSoup edge of its corresponding occupied cuboid. A presence flag ($s_k$) of a TriSoup edge may indicate whether a TriSoup vertex ($V_k$) is present or not on the TriSoup edge. At most one TriSoup vertex ($V_k$) may be present on a TriSoup edge. For each vertex ($V_k$) present on a TriSoup edge of an occupied cuboid, the TriSoup node corresponding to the occupied cuboid may further comprise a position ($p_k$) of the vertex ($V_k$) along the TriSoup edge.

In addition to the occupancy words of an occupancy tree, an encoder may entropy encode the TriSoup vertex presence flags and positions of each TriSoup edge belonging to TriSoup nodes of the occupancy tree. A decoder may similarly entropy decode the TriSoup vertex presence flags and positions of each TriSoup edge belonging to a TriSoup node of the occupancy tree, in addition to the occupancy words of the occupancy tree.

Figure 7:
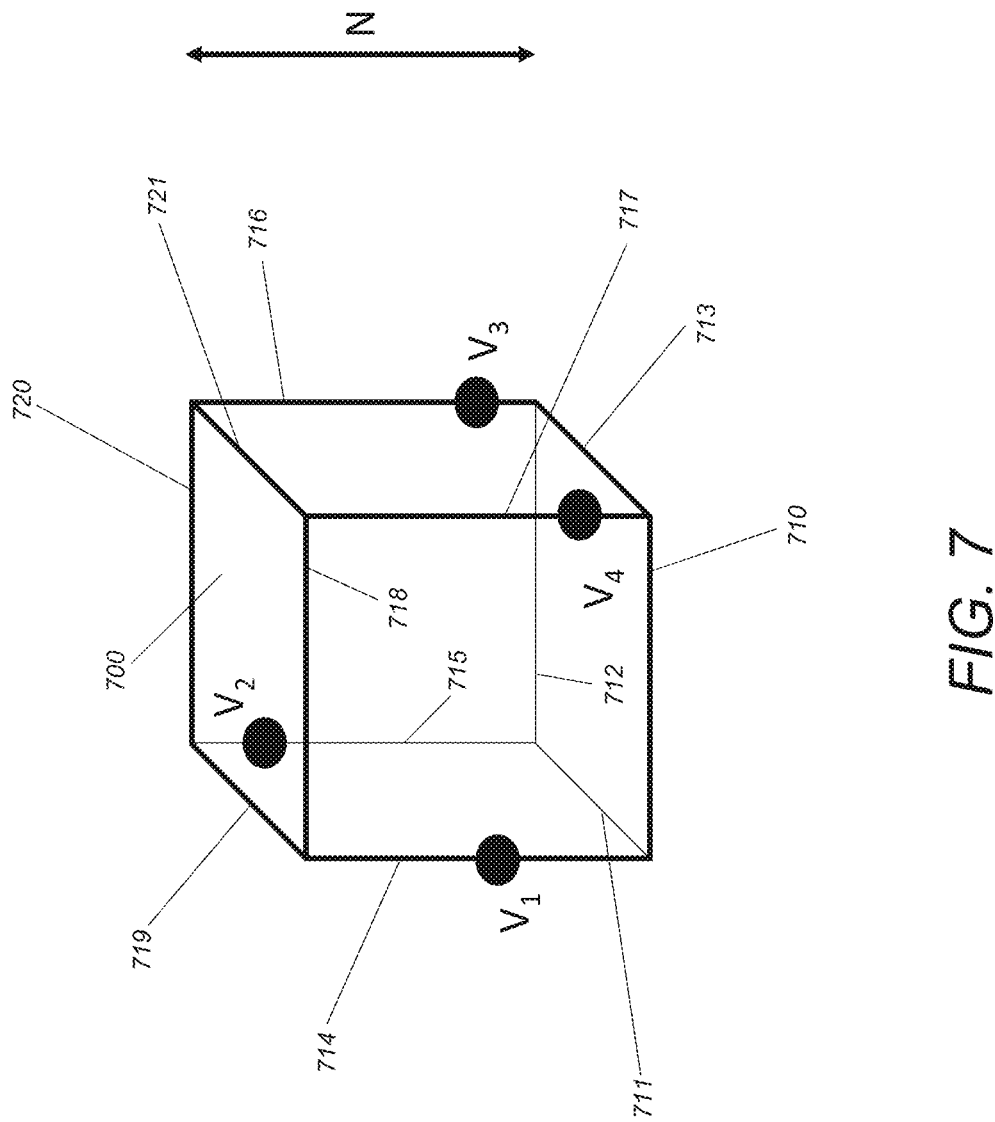
FIG. 7 shows an example of an occupied cuboid that corresponds to a TriSoup node of an occupancy tree.

FIG. 7 shows an example of an occupied cuboid (e.g., an occupied cuboid 700) that corresponds to a TriSoup node of an occupancy tree. The occupied cuboid 700 may be of size N×N×N (where N>1). The occupied cuboid 700 may comprise TriSoup edges 710-721. The TriSoup node, corresponding to the occupied cuboid 700, may comprise a presence flag ($s_k$) for each TriSoup edge of TriSoup edges 710-721. The presence flag of TriSoup edge 714 may indicate that a TriSoup vertex $V_1$ is present on TriSoup edge 714. The presence flag of TriSoup edge 715 may indicate that a TriSoup vertex $V_2$ is present on TriSoup edge 715. The presence flag of TriSoup edge 716 may indicate that a TriSoup vertex $V_3$ is present on TriSoup edge 716. The presence flag of TriSoup edge 717 may indicate that a TriSoup vertex $V_4$ is present on TriSoup edge 717. The presence flags of the remaining TriSoup edges may each indicate that a TriSoup vertex is not present on their corresponding TriSoup edge. The TriSoup node, corresponding to occupied cuboid 700, may further comprise a position for each TriSoup vertex present along one of its TriSoup edges 710-721. More specifically, the TriSoup node, corresponding to occupied cuboid 700, may further comprise a position $p_1$ for TriSoup vertex $V_1$, a position $p_2$ for TriSoup vertex $V_2$, a position $p_3$ for TriSoup vertex $V_3$, and a position $p_4$ for TriSoup vertex $V_4$.

Figure 8A:
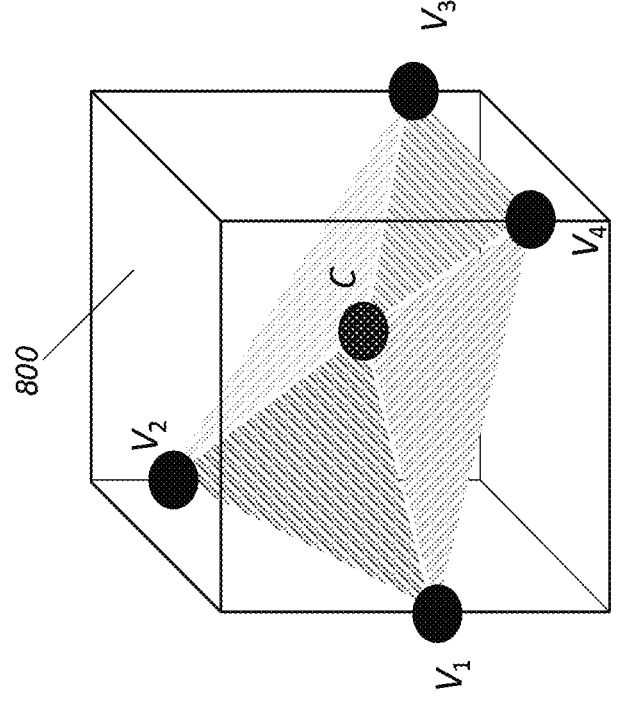
FIG. 8A shows an example cuboid corresponding to a TriSoup node.

FIG. 8A shows an example cuboid corresponding to a TriSoup node. A cuboid 800 may correspond to a TriSoup node with a quantity (e.g., number) K of TriSoup vertices $V_k$. Within the cuboid 800, TriSoup triangles may be constructed from the TriSoup vertices $V_k$. TriSoup triangles may be constructed from the TriSoup vertices $V_k$, for example, if at least three (K≥3) TriSoup vertices are present on the TriSoup edges of cuboid 800. In the example of FIG. 8A, 4 TriSoup vertices are present and TriSoup triangles are constructed. The TriSoup triangles may be constructed around the centroid vertex C. The centroid vertex C may be defined as the mean of the TriSoup vertices $V_k$. A dominant direction may be determined, vertices $V_k$ may be ordered by turning around this direction, and the following K TriSoup triangles may be constructed: $V_1V_2C$, $V_2V_3C$, . . . , $V_KV_1C$. The dominant direction may be chosen among the three directions respectively parallel to the axes of the 3D space to increase or maximize the 2D surface of the triangles, for example, if the triangles are projected along the dominant direction. The dominant direction may be somewhat perpendicular to a local surface defined by the points of the point cloud belonging to the TriSoup node.

Figure 8B:
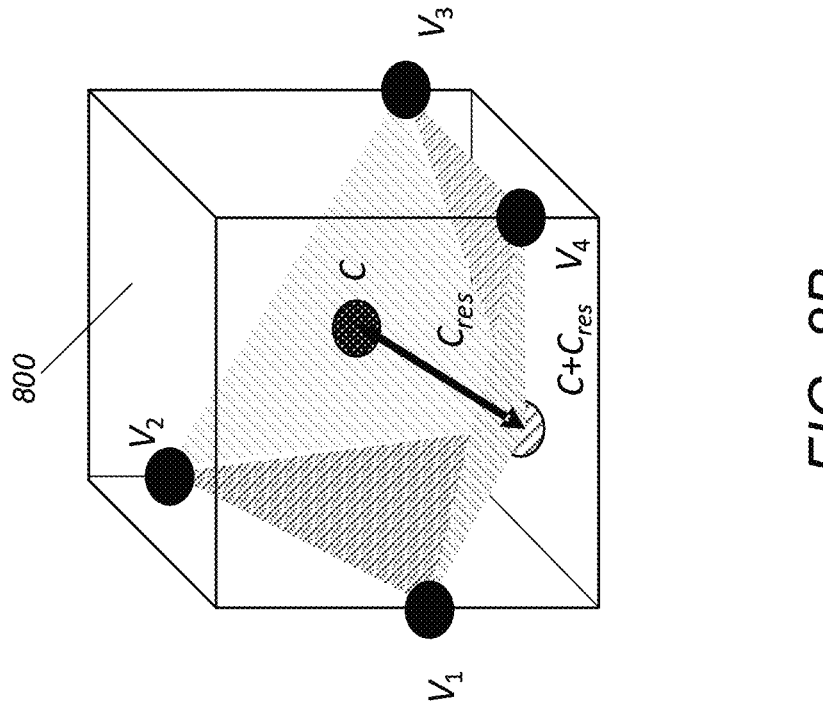
FIG. 8B shows an example refinement to a TriSoup model.

FIG. 8B shows an example refinement to the TriSoup model. The TriSoup model may be refined by coding a centroid residual value. A centroid residual value $C_{res}$ may be coded into the bitstream. A centroid residual value $C_{res}$ may be coded into the bitstream, for example, to use $C+C_{res}$ instead of C as a pivoting vertex for the triangles. By using $C+C_{res}$ as the pivoting vertex for the triangles, the vertex $C+C_{res}$ may be closer to the points of the point cloud than the centroid C, the reconstruction error may be lowered, thereby leading to lower distortion at the cost of a small increase in bitrate needed for coding $C_{res}$.

Figure 9:
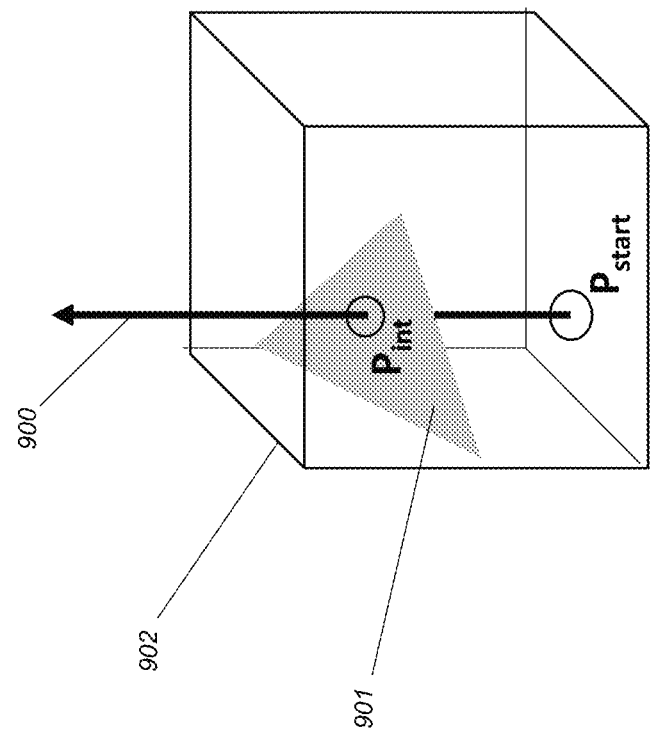
FIG. 9 shows an example of voxelization.

FIG. 9 shows an example of voxelization. Voxelization may refer to reconstruction of a decoded point cloud from the set of TriSoup triangles. Voxelization may be performed by ray tracing for each triangle individually. Voxelization may be performed by ray tracing for each triangle individually, for example, before removing duplicated points between voxelized triangles. As shown in FIG. 9, rays 900 may be launched parallel to one of the three axes of the 3D space. Rays 900 may be launched starting from integer coordinates $P_{start}$. The intersection $P_{int}$ (if any) of the rays 900 with a TriSoup triangle 901 belonging to a cuboid 902 corresponding to a TriSoup node may be rounded to obtain a decoded point. This intersection $P_{int}$ may be found, for example, using the Möller-Trumbore algorithm.

A presence flag ($s_k$) and, if the presence flag ($s_k$) indicates the presence of a vertex, a position ($p_k$) of a current TriSoup edge may be entropy coded. The presence flag ($s_k$) and position ($p_k$) may be individually or collectively referred to as vertex information. A presence flag ($s_k$) and, if the presence flag ($s_k$) indicates the presence of a vertex, a position ($p_k$) of a current TriSoup edge may be entropy coded, for example, based on already-coded presence flags and positions of TriSoup edges that neighbor the current TriSoup edge. A presence flag ($s_k$) and, if the presence flag ($s_k$) indicates the presence of a vertex, a position ($p_k$) of a current TriSoup edge may be additionally or alternatively entropy coded. The presence flag ($s_k$) and the position ($p_k$) of a current TriSoup edge may be additionally or alternatively entropy coded, for example, based on occupancies of cuboids that neighbor the current TriSoup edge. Similar to the entropy coding of the occupancy bits of the occupancy tree, a configuration $\beta_{TS}$ for a neighborhood (also referred to as a neighborhood configuration $\beta_{TS}$) of a current TriSoup edge may be obtained and dynamically reduced into a reduced configuration $$\beta'_{TS} = DR^n(\beta_{TS}).$$

The configuration $\beta_{TS}$ for a neighborhood of a current TriSoup edge may be obtained and dynamically reduced into a reduced configuration $$\beta'_{TS} = DR^n(\beta_{TS}),$$

for example, by using a dynamic OBUF scheme for TriSoup. A context index LUT[$\beta_{TS}$'] may be obtained from the OBUF LUT. At least a part of the vertex information of the current TriSoup edge may be entropy coded using the context (e.g., probability model) pointed to by the context index.

The TriSoup vertex position ($p_k$) (if present) along its TriSoup edge may be binarized. The TriSoup vertex position ($p_k$) (if present) along its TriSoup edge may be binarized, for example, to use a binary entropy coder to entropy code at least part of the vertex information of the current TriSoup edge. A number (e.g., quantity) of bits $N_b$ may be set for the quantization of the TriSoup vertex position ($p_k$) along the TriSoup edge of length N. The TriSoup edge of length N may be uniformly divided into $2^{Nb}$ quantization intervals. By doing so, the TriSoup vertex position ($p_k$) may be represented by $N_b$ bits $$(p_k^j, j = 1, \ldots, N_b)$$

that may be individually coded by the dynamic OBUF scheme as well as the bit corresponding to the presence flag ($s_k$). The neighborhood configuration $\beta_{TS}$, the OBUF reduction function $DR^n$, and thus the context index may depend on the nature of the coded bit (e.g., presence flag ($s_k$), highest position bit ($p_k^1$), second highest position bit ($p_k^2$), etc.). There may be several dynamic OBUF schemes, each dedicated to a specific bit of information (e.g., presence flag ($s_k$) or position bit ($p_k^j$)) of the vertex information.

Figure 10A:
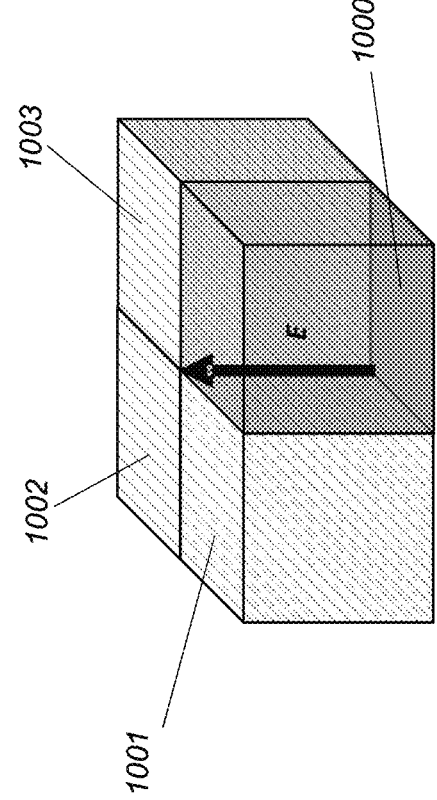
FIG. 10A and FIG. 10B show cuboids with volumes that intersect a current TriSoup edge being entropy coded.
Figure 10B:
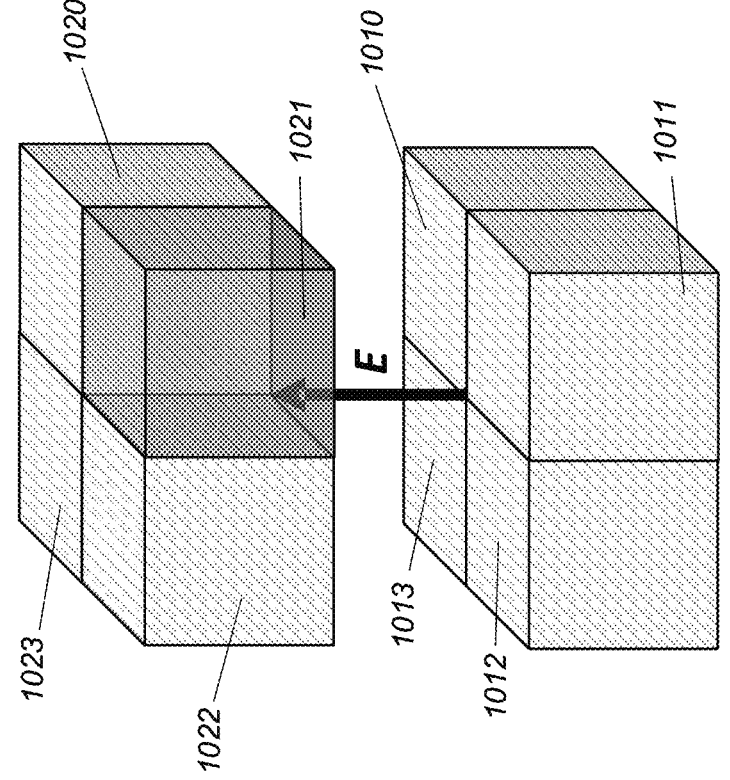

FIG. 10A and FIG. 10B show cuboids (e.g., cuboids 1000-1003 in FIG. 10A, cuboids 1010-1013, and cuboids 1020-1023 in FIG. 10B) with volumes that intersect a current TriSoup edge (e.g., a current TriSoup E) being entropy coded. The current TriSoup edge E is an edge of cuboids 1000-1003. The start point of the current TriSoup edge E intersects cuboids 1010-1013. The end point of the current TriSoup edge E intersects cuboids 1020-1023. The occupancy bits of one or more of the 12 cuboids 1000-1003, 1010-1013, and 1020-1023 may be used to determine the neighborhood configuration $\beta_{TS}$ for the current TriSoup edge E.

TriSoup edges may be oriented from a start point to an end point following the orientation of one of the three axes of the 3D space they are parallel to. A global ordering of the TriSoup edges may be defined as the lexicographic order over the couple (e.g., start point, end point). Vertex information related to the TriSoup edges may be coded following the TriSoup edge ordering. A causal neighborhood of a current TriSoup edge may be obtained from the neighboring already-coded TriSoup edges of the current TriSoup edge.

Figure 11A:
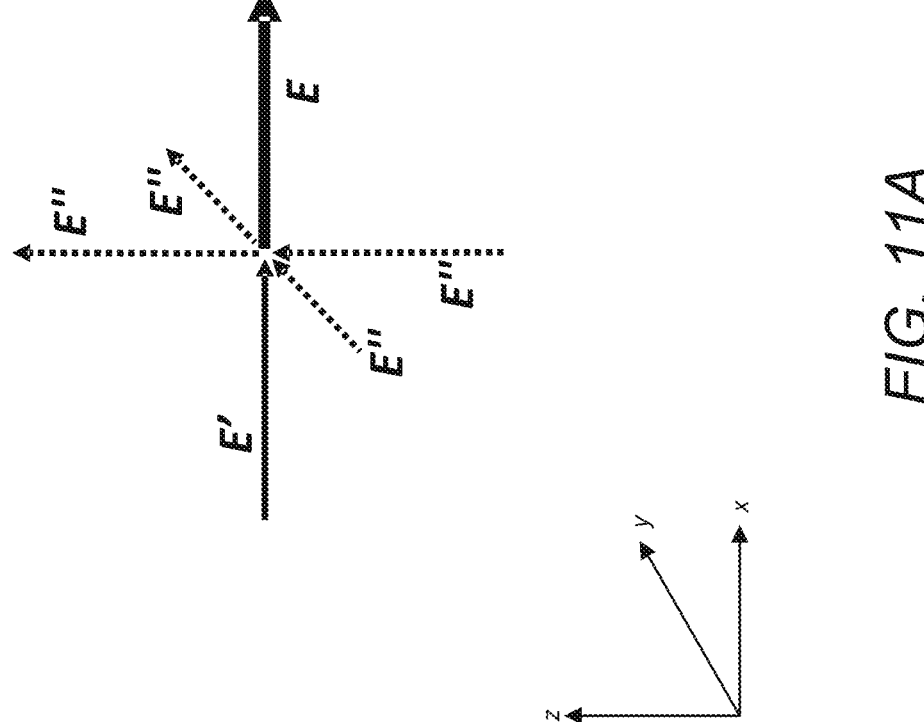
FIG. 11A, FIG. 11B, and FIG. 11C show TriSoup edges that may be used to entropy code a current TriSoup edge.
Figure 11B:
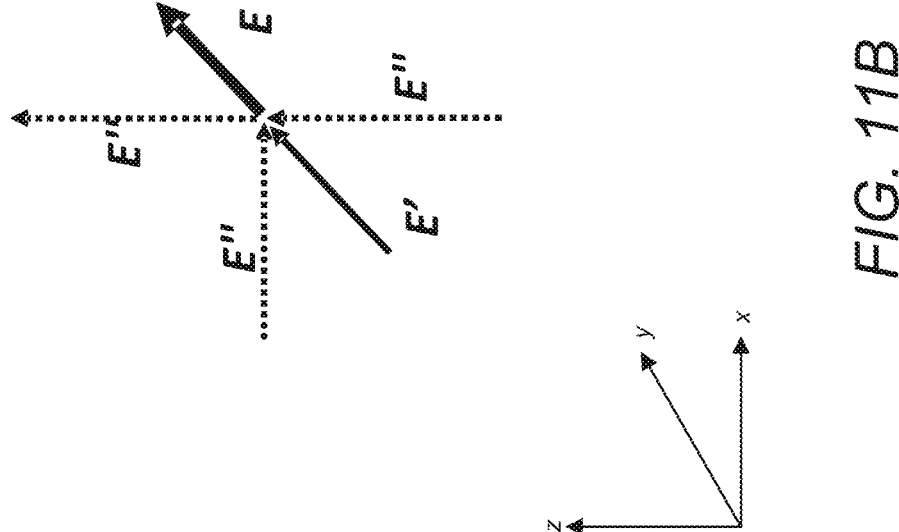
Figure 11C:
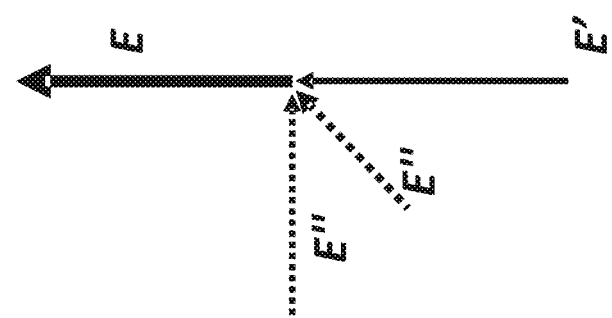
Figure 11C:
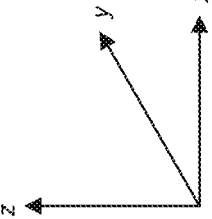

FIG. 11A, FIG. 11B, and FIG. 11C show TriSoup edges (E' and E") that may be used to entropy code a current edge E. In some instances, at most five TriSoup edges (E' and E") may be used to entropy code the current TriSoup edge E. The five TriSoup edges may include, the edge E' parallel to the current TriSoup edge E and having an end point equal to the start point of the current TriSoup edge E, and the four edges E" perpendicular to the current TriSoup edge E and having a start or end point equal to the start point of the current TriSoup edge E.

Depending on the direction of the current TriSoup edge E, either two (FIG. 11C for direction z), three (FIG. 11B for direction y), or four (FIG. 11A for direction x) of the four perpendicular TriSoup edges may have been already coded and their vertex information may be used to construct the neighborhood configuration $\beta_{TS}$ for the current TriSoup edge E. The TriSoup edge E' may have already been coded for each direction of the current TriSoup edge E and its vertex information may be used to construct the neighborhood configuration $\beta_{TS}$ for the current TriSoup edge E independent of its direction.

As described herein, the neighborhood configuration $\beta_{TS}$ for a current TriSoup edge E may be obtained from one or more occupancy bits of cuboids and from the vertex information of neighboring already-coded TriSoup edges. The neighborhood configuration $\beta_{TS}$ for the current TriSoup edge E may be obtained from one or more of the 12 occupancy bits of the 12 cuboids shown in FIG. 10A and FIG. 10B and from the vertex information of the at most five neighboring already-coded TriSoup edges (E' and E") shown in FIGS. 11A, 11B, and 11C.

Performance may be improved by using inter frame prediction, for example, in video compression. Bitrates needed to compress inter frames may be typically one to two orders of magnitude lower than bitrates of intra frames that, by definition, do not use inter frame prediction. Point cloud data may behave differently because the 3D geometry is coded, unlike video coding where typically only the attributes (e.g., colors) are coded after projection of the 3D geometry onto a 2D plane (e.g., a camera sensor). Even if 2D-projected attributes are expected to temporally have a higher correlation than their underlying 3D geometry, it may be expected that inter frame prediction between 3D point clouds may provide improved compression capability than intra frame prediction alone within a point cloud. The octree may benefit from inter frame prediction and geometry compression gains.

Figure 12:
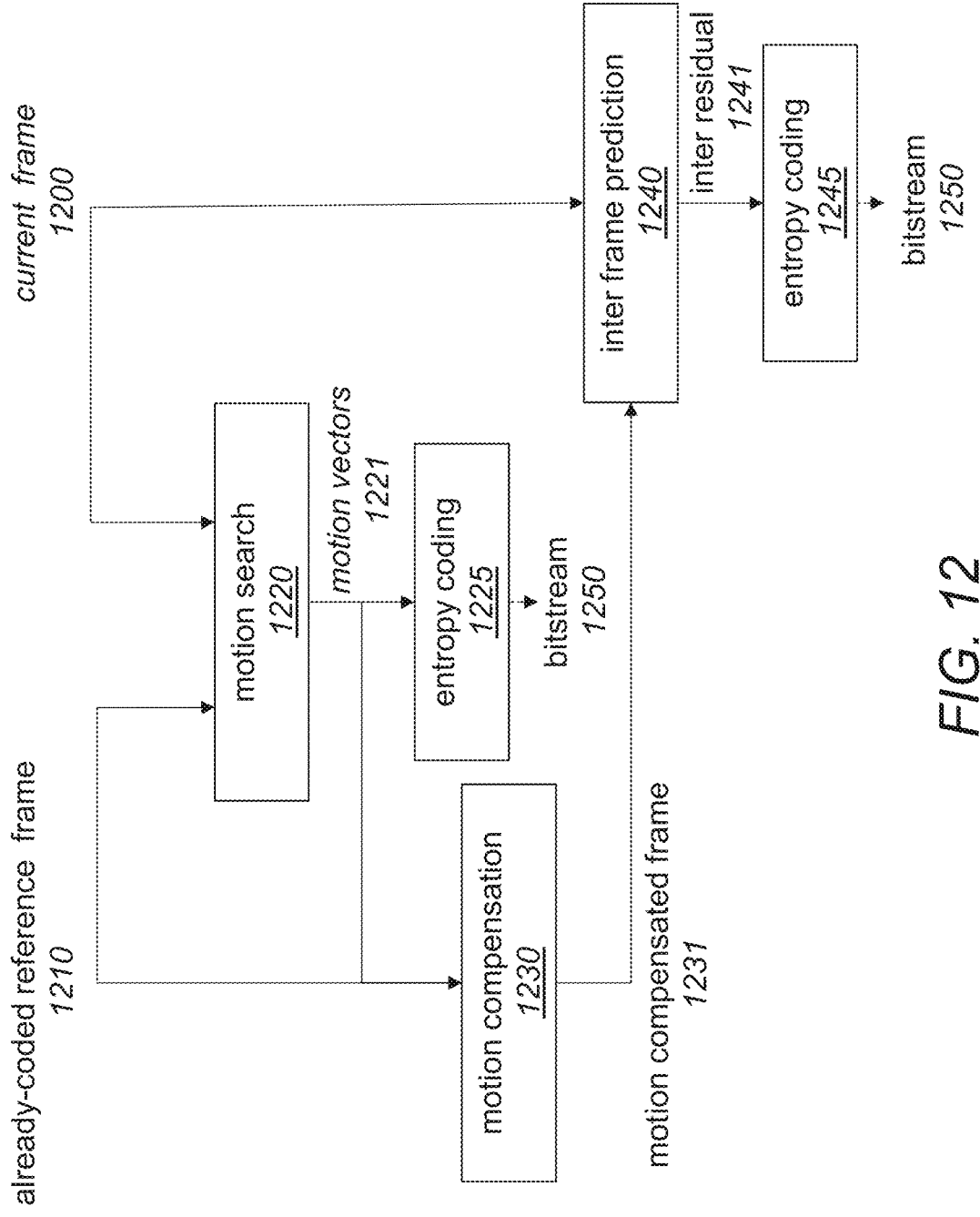
FIG. 12 shows an example encoding method.

FIG. 12 shows an example encoding method. One or more steps of FIG. 12 may be performed by an encoder and/or a decoder (e.g., the encoder 114 and/or decoder 120 in FIG. 1), an example computer system 1700 in FIG. 17, and/or an example computing device 1830 in FIG. 18. A general framework of inter frame prediction for 3D point clouds may be similar to the one of video compression for the coding (e.g., encoding) process as described herein with respect to FIG. 12. A current frame 1200 (e.g., image or point cloud) may be coded based on an already-coded reference frame 1210 (e.g., image or point cloud). A motion search 1220 may be performed from the already-coded reference frame 1210 toward the current frame 1200, for example, to obtain motion vectors 1221. The motion vectors 1221 may represent a motion flow between the already-coded reference frame 1210 and the current frame 1200.

Motion vectors may be 2-component (e.g., 2D) vectors that may represent a motion from reference blocks of pixels to current blocks of pixels, for example, in at least some video compression. Motion vectors may be 3-component (e.g., 3D) vectors that may represent a motion from reference sets of 3D points to current sets of 3D points, for example, in at least some point cloud compression. The motion vectors 1221 may be entropy-coded (at step 1225, as shown in FIG. 12) into a bitstream 1250. The reference frame 1210 may be motion-compensated (at step 1230, as shown in FIG. 12), for example, to obtain a motion compensated-frame 1231. Motion compensation may involve moving the pixels of the reference image (respectively point cloud), for example, according to the 2D motion vectors, and/or moving the points of the reference point cloud according to the 3D motion vectors. The obtained motion compensated frame 1231 may be "closer" to the current frame 1200 than the reference frame 1210. A The obtained motion compensated frame 1231 may be closer to the current frame 1200 than the reference frame 1210, for example, in that the color difference (and/or point distance) between the motion compensated frame 1231 and the current frame 1200 may be smaller than between the reference frame 1210 and the current frame 1200. The obtained motion compensated frame 1231 may be closer to the current frame 1200 than the reference frame 1210, for example, the color difference and/or point distance between the motion compensated frame 1231 and the current frame 1200 may be, on average, smaller than that between the reference frame 1210 and the current frame 1200. At step 1240, inter frame prediction may be performed, for example, to obtain inter residual(s) 1241. The inter residual(s) 1241 may be entropy coded (at step 1245, as shown in FIG. 12) into a bitstream 1250. The inter residual(s) 1241 may carry more compressible information than the current frame 1200 or a current frame that has undergone an intra prediction process. The entropy coding 1245 may be more efficient for obtaining a bitstream 1250 with reduced size compared to a bitstream obtained by coding the current frame 1200 that may have not benefited from inter frame prediction.

Inter residuals (e.g., the inter residuals 1241) may be constructed as a difference of colors, pixel per pixel, between a current block of pixels belonging to the current frame (e.g., image) and a co-located compensated block of pixels belonging to the motion compensated frame (e.g., image), for example, in video coding. The inter residuals (e.g., the inter residuals 1241) may be arrays of color differences that may have a small magnitude and thus may be efficiently compressed.

There may be no such concept as the difference between two sets of points. The concept of an inter residual may not be straightforwardly generalized to point clouds, for example, in point cloud compression. For prediction of an octree that may represent a point cloud, the concept of inter residual may be replaced by conditional entropy coding, where conditional information for performing conditional entropy coding may be constructed, for example, based on a motion compensated point cloud. This approach may be extended to the framework of dynamic Optimal Binary Coders with Update on the Fly (OBUF).

As described herein, a current occupancy bit of an octree may be coded by an entropy coder. The entropy coder may be selected by the output of a dynamic OBUF Look-Up Table (LUT) of coder indices that may use a neighborhood configuration R as input. The neighborhood configuration β may be constructed, for example, based on already-coded occupancy bits associated with neighboring volumes relative to the current volume. The current volume may be associated with the current node whose occupancy may be signaled by the current occupancy bit. The construction of the neighborhood configuration R may be extended, for example, by using inter frame information. An inter predictor occupancy bit may be defined for a current occupancy bit as a bit representative of the presence of at least one point of a motion compensated point cloud within the current volume. A strong correlation between the current occupancy bit and the inter predictor occupancy bit may exist, for example, if motion compensation is efficient, because the current compensated point cloud and motion compensated point clouds may be close to each other. Using the inter predictor occupancy bit as a bit of the neighborhood configuration R may lead to better compression performance of the octree (e.g., dividing the size of the octree bitstream by a factor two).

A motion field between octrees may comprise 3D motion vectors associated with 3D prediction units. The 3D prediction units may have volumes embedded into the volumes (e.g., cuboids) associated with nodes of the octree. A motion compensation may be performed volume per volume, for example, based on the 3D motion vectors to obtain a motion compensated point cloud in one or more current volumes. An inter predictor occupancy bit may be obtained, for example, based on the presence of at least one point of the motion compensated point cloud.

As discussed herein, FIG. 8A shows a cube 800 corresponding to a TriSoup node with a quantity (e.g., number) K of TriSoup vertices $V_k$. Within cube 800, TriSoup triangles may be constructed from the TriSoup vertices $V_k$ if at least three (K≥3) TriSoup vertices are present on the TriSoup edges of cube 800. In the example of FIG. 8A, four (4) TriSoup vertices are present and therefore TriSoup triangles may be constructed. The TriSoup triangles may be constructed around a centroid vertex C. The centroid vertex C may be defined as the mean of the TriSoup vertices $V_k$. To do so, a dominant direction may first be determined, then vertices $V_k$ may be ordered by turning around this direction, and the following K TriSoup triangles may be constructed: V1V2C, V2V3C, . . . , $V_k$V1C. The dominant direction may be chosen among the three directions parallel to the axis of the 3D space to increase or maximize the 2D surface of the triangles, for example, if projected along the dominant direction. By doing so, the dominant direction may be perpendicular (or partially perpendicular) to a local surface defined by the points of the point cloud belonging to the TriSoup node.

As further discussed above, FIG. 8B shows a refinement to the TriSoup model by coding a centroid residual value $C_{res}$ into the bitstream such as to use $C+C_{res}$ instead of C as pivoting vertex for the triangles. By doing so, the vertex $C+C_{res}$ may be closer to the points of the point cloud than the centroid C, resulting in lowered reconstruction error, and leading to lower distortion in view of a small increase in bitrate needed for coding $C_{res}$.

Figure 13:
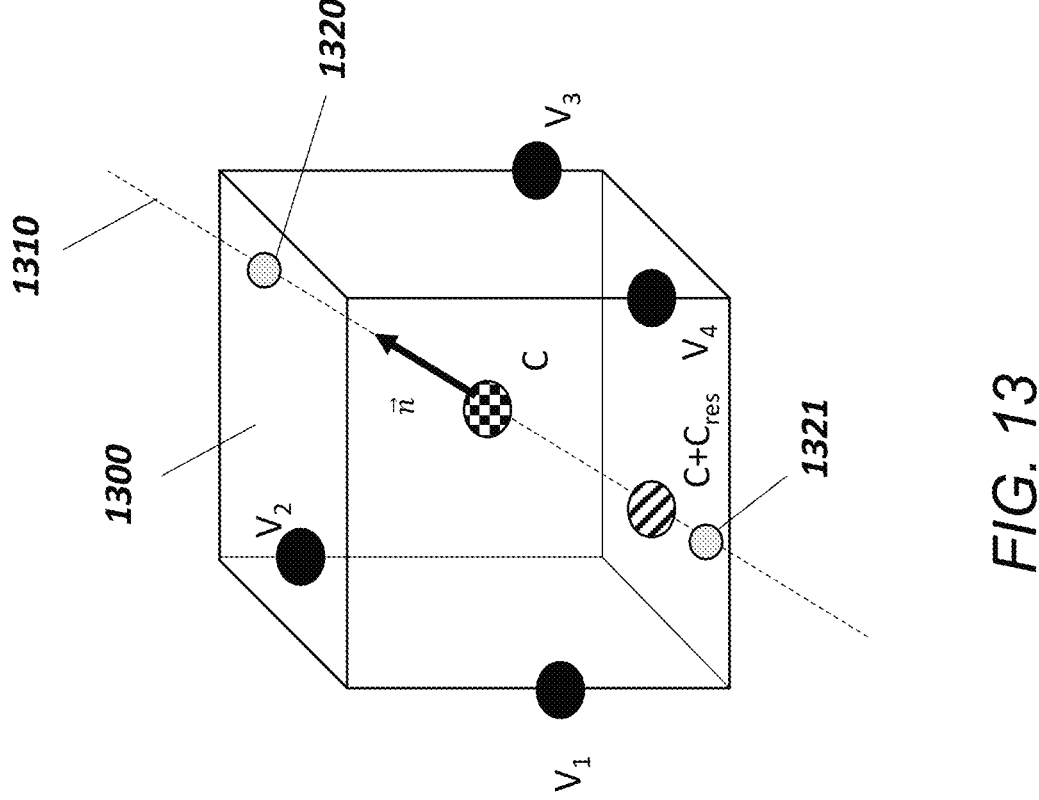
FIG. 13 shows an example of encoding a centroid residual value.

FIG. 13 shows an example of encoding a centroid residual value. An encoder may encode, for example, a centroid residual value $C_{res}$ into a bitstream. $C+C_{res}$ may be used instead of C, for example, as a pivoting vertex for the triangles. A unitary vector $\vec{n}$ may be determined as the mean and normalization of normal vectors to the triangles $(V_1V_2C, V_2V_3C, . . . , V_KV_1C)$, which may be constructed by pivoting around the centroid C. The vector $\vec{n}$ may be the normalized vector of the following mean of cross-products $(\vec{V_1C} \times \vec{V_2C} + \vec{V_2C} \times \vec{V_3C} + . . . + \vec{V_KC} \times \vec{V_1C})/K$. The vector $\vec{n}$ may be indicative of the direction normal to a local surface that is represented by the point cloud. A one-component residual $\alpha_{res}$ along the line (C, $\vec{n}$) 1310 may be coded (e.g., encoded) instead of the 3D centroid residual value $C_{res}$, for example, to increase the effect of the centroid residual value $C_{res}$ and/or to decrease its coding cost. The 3D centroid residual value $C_{res}$ may be, for example, the one-component residual $\alpha_{res}$ multiplied by the unitary vector $\vec{n}$ (e.g., $C_{res}=\alpha_{res}\vec{n}$).

The encoder may determine the residual value $\alpha_{res}$. The encoder may determine the residual value $\alpha_{res}$ as the intersection between the current point cloud and the line (C, $\vec{n}$). For example, a set of points (e.g., a set of closest points relative to the line) of the current point cloud may be determined. The points may be projected on the line and the residual value $\alpha_{res}$ may be the mean component along the line of the projected points. The mean may be a weighted mean whose weights may depend on a distance of the closest points from the line.

The residual value $\alpha_{res}$ may be quantized. The residual value $\alpha_{res}$ may be quantized, for example, by a uniform quantization function that may have a quantization step similar to the quantization precision of the TriSoup vertices $V_k$. The quantization error may be uniform over all vertices $V_k$ and/or $C+C_{res}$ such that the local surface may be uniformly approximated. The residual value $\alpha_{res}$ may be binarized and/or coded (e.g., entropy coded) into the bitstream. The residual value $\alpha_{res}$ may be binarized and/or coded (e.g., entropy coded) into the bitstream, for example, by using a typical unary-based scheme. For example, a flag $f_0$ indicating if the residual value $\alpha_{res}$ is equal to zero may be coded. If $\alpha_{res}$ is not equal to zero, a sign bit may be coded and/or the residual magnitude $|\alpha_{res}|-1$ may be coded using a unary scheme that may code successive flags $f_i$ ($i \geq 1$) indicating if the residual value magnitude $|\alpha_{res}|$ is equal to 'i'. The residual value $\alpha_{res}$ may be binarized into the flags $f_i$ ($i \geq 0$) and/or the sign bit that may be entropy coded by a coder (e.g., a binary entropy coder).

Compression of the residual value $\alpha_{res}$ may be improved. Compression of the residual value $\alpha_{res}$ may be improved, for example, by determining bounds as shown in FIG. 13. The line (C, $\vec{n}$) 1310 may intersect the current TriSoup node 1300 at two bounding points 1320 and 1321. The encoder may ensure that the point C+$C_{res}$ is located between the two bounding points. By ensuring that the point C+$C_{res}$ is located between the two bounding points, this implies bounds on the (quantized) residual value $\alpha_{res}$ such that the (quantized) residual value $\alpha_{res}$ may belong to an integral interval [m, M], where $m \leq 0 \leq M$. Some bits of the binarized residual value $\alpha_{res}$ may be inferred. $\alpha_{res}$ may be necessarily equal to zero, for example, if m=M=0, The sign bit may be necessarily positive, for example, if m=0<M. The magnitude of the residual value $|\alpha_{res}|$ may be bounded by either $|m|$ or M such that the magnitude may be coded by a truncated unary scheme that may infer the value of the last of successive flags $f_i$ ($i \geq 1$), for example, rf the residual value $\alpha_{res}$ is not equal to zero and its sign is known.

The coder (e.g., binary entropy coder) used to code the binarized residual value $\alpha_{res}$ may be a context-adaptive binary arithmetic coder (CABAC). The probability (or context) used to code at least one bit ($f_i$ or sign bit) of the binarized residual value $\alpha_{res}$ may evolve, for example, depending on the value of the at least one bit ($f_i$ or sign bit) of the binarized residual value $\alpha_{res}$. The context/probability of the coder (e.g., binary entropy coder) may be determined, for example, based on contextual information. The contextual information may include the values of the bounds m and M, the location of vertices $V_k$ or the size of the TriSoup node. The selection of the coder (or the selection of the probability or context of the coder) may be performed by a dynamic OBUF scheme that may use the contextual information described herein as entry.

For lossy coding of dense point clouds, a TriSoup method may be more efficient than an octree only approach, which may be primarily a lossless method. Even using inter frame prediction as described herein, the octree may not be competitive against the octree for lossy coding of point clouds. TriSoup is an enhancement of an uncomplete octree, and inter prediction for octree may benefit the overall TriSoup scheme by reducing the bitrate of the octree over which TriSoup is an enhancement, for example, because TriSoup may be an enhancement of an uncomplete octree.

The TriSoup method may not benefit fully from an inter frame correlation, for example, because the centroid residual value $C_{res}$ or $\alpha_{res}$ may not be coded based on any reference frame. Examples of the present disclosure may code the centroid residual value $C_{res}$ or $\alpha_{res}$ may be coded, for example, based on a motion compensated point cloud. The motion compensated point cloud may be determined, for example, if the coding of the underlying octree occurs as discussed herein.

The use of the motion compensated point cloud to code centroid residual value $C_{res}$ or $\alpha_{res}$ may add inter frame correlation to the intra frame correlation on which the determining of the probability/context may be based upon. Adding inter frame correlation may lead to a better selection of the entropy coder (equivalently its associated probability model) and improve the compression of the centroid residual value ($C_{res}$ or $\alpha_{res}$), resulting in a reduction of the overall quantity (e.g., number) of bits needed to represent the geometry of the point cloud after compression.

The motion compensated point cloud may be used, for example, to select a probability/context of a coder (e.g., an entropy coder) that may code at least a part (or a bit) of the centroid residual value $C_{res}$ or $\alpha_{res}$. The selection of the probability model/context may be performed, for example, by a dynamic OBUF scheme. Contextual information may be constructed, for example, based on the motion compensated point cloud. Contextual information may be used as an entry of (or input to) the OBUF LUT, which may output a coder index, for example, to select an entropy coder (equivalently a probability model).

Figure 14A:
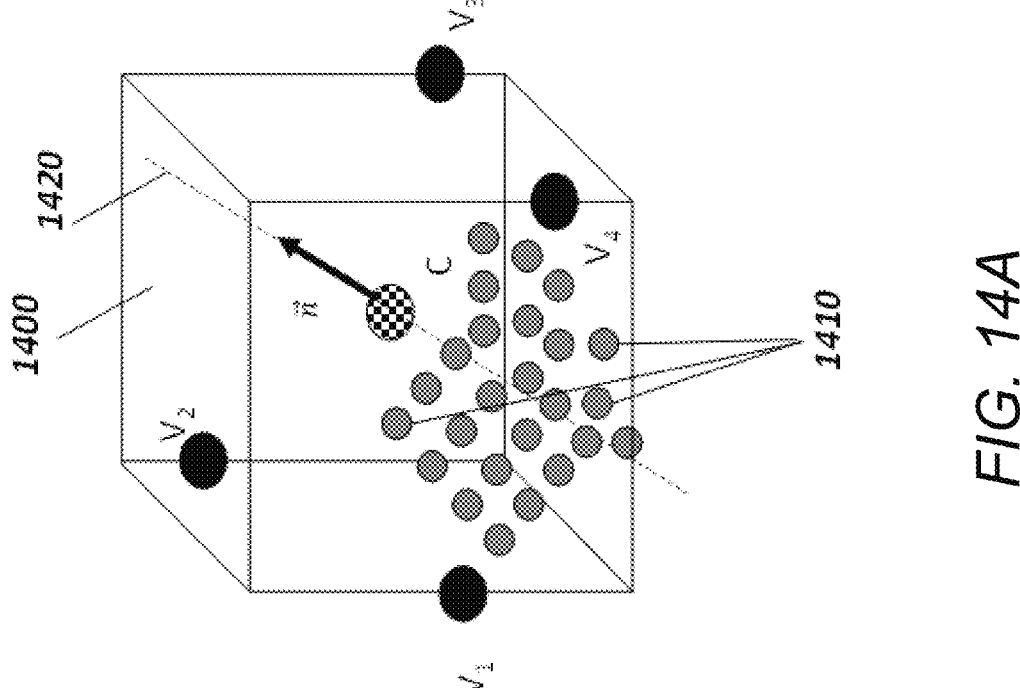
FIG. 14A and FIG. 14B show examples of a TriSoup node and compensated points belonging to a motion compensated point cloud.
Figure 14B:
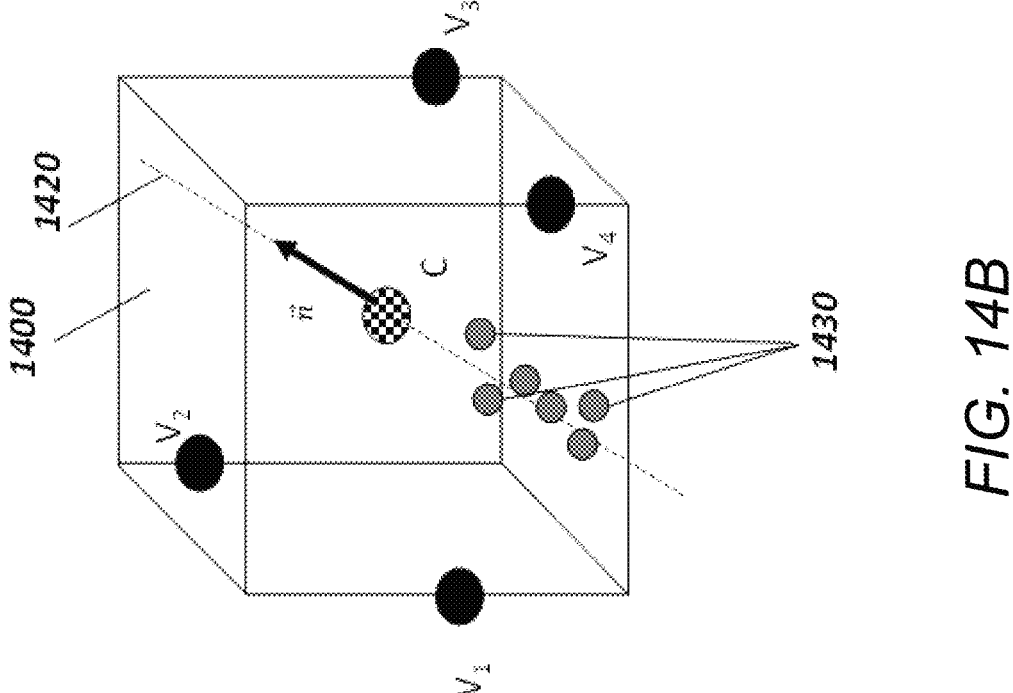

FIG. 14A and FIG. 14B show an example TriSoup node and compensated points belonging to a motion compensated point cloud. More specifically, FIG. 14A shows a current TriSoup node 1400 and compensated points 1410 belonging to a motion compensated point cloud. The motion compensated point cloud may be determined, for example, based on a reference point cloud (as described herein) to better match (e.g., be closer to) the point cloud of the current TriSoup node 1400. The occupancy of the points of the motion compensated point cloud may be used, for example, to determine one or more probability models/contexts for coding (e.g., entropy coding, arithmetic coding) the centroid residual value $C_{res}$ and/or $\alpha_{res}$ associated with the current TriSoup node 1400. The occupancy of the points of the motion compensated point cloud, which may be within some distance to TriSoup node 1400, may be used for example to determine one or more probability models/contexts for coding (e.g., entropy coding, arithmetic coding) the centroid residual value $C_{res}$ and/or $\alpha_{res}$ associated with the current TriSoup node 1400. Individual occupancies of the point locations of the motion compensated point cloud may be used directly as bits. The bits may constitute contextual information used to determine the one or more probability models/contexts for coding (e.g., entropy coding, arithmetic coding) the centroid residual value $C_{res}$ and/or $\alpha_{res}$ associated with the current TriSoup node 1400. The quantity (e.g., number) of such occupancy bits may be large and/or may lead to an impractical quantity (e.g., number) of probability models/contexts to be stored and/or tracked by the coder. The occupancy bits may be combined and/or reduced.

The quantity (e.g., number) of compensated points of the motion compensated point cloud used to determine the one or more probability models/contexts for entropy coding the centroid residual value $C_{res}$ and/or $\alpha_{res}$ associated with the current TriSoup node 1400 may be reduced, for example, by using compensated points of the motion compensated point cloud belonging to (and/or contained within) the current TriSoup node 1400. This may be advantageous because determining whether compensated points of the motion compensated point cloud belong to (and/or that may be contained within) the current TriSoup node 1400 may be efficiently performed, for example, if the construction of the underlying octree occurs and/or search of compensated points neighboring the TriSoup node is not needed.

The quantity (e.g., number) of compensated points of the motion compensated point cloud used to determine the one or more probability models/contexts for coding the centroid residual value $C_{res}$ and/or $\alpha_{res}$ associated with the current TriSoup node 1400 may be reduced, for example, by using compensated points 1430 of the motion compensated point cloud belonging to (and/or contained within) the current TriSoup node 1400. Additionally, or alternatively, the quantity (e.g., number) of compensated points of the motion compensated point cloud used to determine the one or more probability models/contexts for coding the centroid residual value $C_{res}$ and/or $\alpha_{res}$ associated with the current TriSoup node 1400 may be reduced, for example, by using compensated points 1430 of the motion compensated point cloud that also may not be "close" to a line (C, $\vec{n}$) 1420 as shown in FIG. 14B. Whether points are "close" to the line may be defined by an upper bound on the distance of compensated points of the motion compensated point cloud to the line (C, $\vec{n}$) 1420. This distance may be defined as the Euclidian distance between a compensated point (or point location) and its projection on the line (C, $\vec{n}$).

Figure 15:
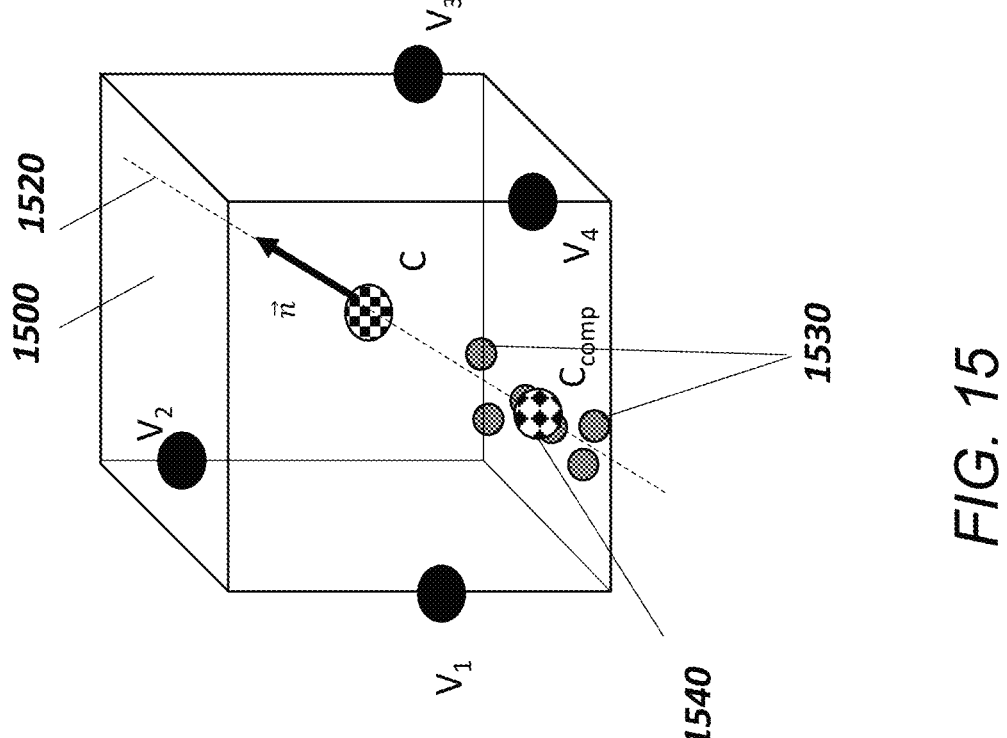
FIG. 15 shows an example TriSoup node and compensated points belong to a motion compensated point cloud.

FIG. 15 shows an example TriSoup node and compensated points belong to a motion compensated point cloud. As described herein with respect to FIG. 15, a compensated intersection point $C_{comp}$ 1540 may be determined from compensated points 1530 and from a line (C, $\vec{n}$) 1520. The compensated points 1530 may neighbor a current TriSoup node 1500. The compensated intersection point $C_{comp}$ 1540 may be determined, for example, by projecting "close" (as defined herein) compensated points 1530 onto the line (C, $\vec{n}$) 1520 and averaging the projected points. The position $\alpha_{comp}$, relative to the centroid point C, of the compensated intersection point $C_{comp}$ along the line (C, $\vec{n}$) may be a good indicator of the position of the point $C+C_{res}$. The position $\alpha_{comp}$, relative to a first vertex (e.g., the centroid point C), of the compensated intersection point $C_{comp}$ along the line (C, $\vec{n}$) may be a good indicator of the position of a second centroid vertex $C+C_{res}$, (e.g., $C+C_{res}$ $C+\alpha_{res}\vec{n}$), for example, if the motion compensated point cloud is close to the current point cloud.

The compensated residual value $\alpha_{comp}$ may be highly correlated with a centroid residual value $\alpha_{res}$. The coding of the centroid residual value $\alpha_{res}$ may be performed, for example, based on the compensated residual value $\alpha_{comp}$. A second centroid residual $\alpha'_{res}$(e.g., $\alpha'_{res}=\alpha_{res}-\alpha_{comp}$) may be determined and/or coded into a bitstream. The amplitude of the second centroid residual $\alpha'_{res}$ may be smaller than the amplitude of the centroid residual value $\alpha_{res}$. The second centroid residual $\alpha'_{res}$ may be more easily compressed than the centroid residual value $\alpha_{res}$, for example, because the amplitude of the second centroid residual $\alpha'_{res}$ may be smaller than the amplitude of the centroid residual value $\alpha_{res}$. Bounds m' and M' on the second centroid residual $\alpha'_{res}$ may be determined. The second centroid residual $\alpha'_{res}$ may be coded using methods discussed herein (e.g., binarization, truncated unary coding, etc.)

The compensated residual value $\alpha_{comp}$ may be used, for example, to select one or more contexts/probability models of a coder (e.g., entropy coder, arithmetic coder) that may code the centroid residual value $\alpha_{res}$. The compensated residual value $\alpha_{comp}$ may be quantized into $Q(\alpha_{comp})$. The quantization function $Q(\cdot)$ of the compensated residual value $\alpha_{comp}$ may be different from the quantization function of the centroid residual value $\alpha_{res}$. The quantized value $Q(\alpha_{comp})$ may be used, for example, to select the one or more contexts/probability models of the coder (e.g., entropy coder, arithmetic coder) that may code the centroid residual value $\alpha_{res}$.

The selection of the probability/context of the coder (e.g., entropy coder) that may code a flag $f_0$, which may indicate if the centroid residual value $\alpha_{res}$ is equal to zero, may be performed, for example, based on the magnitude $|Q(\alpha_{comp})|$ of the quantized compensated residual value $Q(\alpha_{comp})$. The selection of the probability/context may be advantageous, for example, because the flag $f_0$ being true may be correlated with the amplitude $|Q(\alpha_{comp})|$ being small. The selection of the probability/context of the coder (e.g., entropy coder) that may code the sign bit of the centroid residual value $\alpha_{res}$ may be performed, for example, based on the sign and magnitude of the quantized compensated residual value $Q(\alpha_{comp})$. The selection of the probability/context may be advantageous, for example, because the sign bit may be correlated with the sign of $Q(\alpha_{comp})$. A larger magnitude of $Q(\alpha_{comp})$ may indicate a stronger correlation.

Figure 16A:
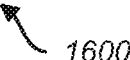
FIG. 16A shows an example method of encoding a centroid residual value of a TriSoup node.

FIG. 16A shows an example method of encoding a centroid residual value of a TriSoup node. More specifically, FIG. 16A shows a flowchart 1600 of example method steps for encoding a centroid residual value of a TriSoup node. One or more steps of flowchart 1600 may be implemented by an encoder, such as the encoder 114 shown in FIG. 1. At step 1602, the encoder may determine a centroid residual value of a TriSoup node. The TriSoup node may be similar to the TriSoup node 1400 as shown in and described herein with respect to FIG. 14A and FIG. 14B. For example, the centroid residual value may comprise three components. The centroid residual value may comprise a single component. The centroid residual value may comprise a single component (e.g., a single component along the line (C, $\vec{n}$) 1420 as shown in FIG. 14A and FIG. 14B).

At step 1604, the encoder may select a context/probability model for encoding the centroid residual value. The encoder may select a context/probability model for encoding the centroid residual value, for example, based on a motion compensated point cloud. The motion compensated point cloud may be determined, for example, based on a reference point cloud (e.g., as described herein) to better match (e.g., be "closer" to) the point cloud of the TriSoup node. The encoder may select the context/probability model, for example, based on compensated points in the motion compensated point cloud. For example, the compensated points may be within the TriSoup node and/or may be within a distance to a line (e.g., the line (C, $\vec{n}$) 1420 as shown in FIG. 14A and FIG. 14B) that may pass through a centroid point (e.g., point C as shown in FIG. 14A and FIG. 14B) of the TriSoup node.

The encoder may determine a compensated intersection point (e.g., compensated intersection point $C_{comp}$ as shown in FIG. 15), for example, based on the compensated points. The compensated intersection point may belong, for example, to a line (e.g., line (C, $\vec{n}$) 1520 as shown in FIG. 15) that may pass through a centroid point (e.g., point C as shown in FIG. 15) of the TriSoup node. The encoder may determine the compensated intersection point (e.g., compensated intersection point $C_{comp}$ as shown in FIG. 15), for example, by projecting one or more of the compensated points onto a line (e.g., line (C, $\vec{n}$) 1520 as shown in FIG. 15) that may pass through a centroid point (e.g., point C as shown in FIG. 15) of the TriSoup node. The encoder may determine the compensated intersection point, for example, by averaging the projections of the one or more compensated points on the line. The encoder may determine a second centroid residual. The encoder may determine a second centroid residual, for example, based on a difference between the centroid residual value and a compensated residual value $\alpha_{comp}$. The encoder may determine the compensated residual value $\alpha_{comp}$, for example, based on the compensated intersection point. The encoder may select the context/probability model, for example, based on the compensated centroid residual value. The encoder may select the context/probability model, for example, based on a quantization of the compensated centroid residual value.

At step 1606, the encoder may encode (e.g., entropy encode, arithmetically encode) the centroid residual value. The encoder may encode (e.g., entropy encode, arithmetically encode) the centroid residual value, for example, based on a context/probability model. The encoder may encode the centroid residual value, for example, by encoding (e.g., entropy encoding) the second centroid residual value $\alpha'_{res}$ discussed herein. The encoder may select the context/probability model for encoding the centroid residual value. The encoder may select the context/probability model for encoding the centroid residual value, for example, based on a look up table that may map a neighborhood configuration to the context/probability model. The neighborhood configuration may be determined, for example, based on a motion compensated point cloud.

The encoder may select the context/probability model for encoding the centroid residual value, for example, based on a look up table that may map a subset of the symbols of a neighborhood configuration (e.g., only the subset of the symbols of the neighborhood configuration) to the context/probability model. The subset of the symbols of the neighborhood configuration may be determined, for example, based on a motion compensated point cloud. A quantity (e.g., number) of symbols in the subset may be increased, for example, based on a quantity (e.g., number) of encoded centroid residual values with neighborhood information comprising the same subset of symbols. The encoder may update the look up table to map the subset of symbols of the neighborhood configuration to a different context/probability model. The encoder may update the look up table to map the subset of symbols of the neighborhood configuration to a different context/probability model, for example, based on the centroid residual value.

FIG. 16B shows an example method of decoding a centroid residual value (e.g., $C_{res}$ in FIG. 8B) of a TriSoup node. More specifically, FIG. 16B shows a flowchart 1650 of example method steps for decoding the centroid residual value of the TriSoup node. One or more steps of flowchart 1650 may be implemented by a decoder, such as the decoder 120 as shown in FIG. 1.

At step 1654, the decoder may select a context/probability model for decoding a centroid residual value (e.g., $C_{res}$ as shown in FIG. 8B). The decoder may select a context/probability model for decoding the centroid residual value, for example, based on a motion compensated point cloud. The motion compensated point cloud may be determined, for example, based on a reference point cloud (e.g., as described herein) to better match (or be "closer" to) the point cloud of the TriSoup node. The decoder may select the context/probability model, for example, based on compensated points in the motion compensated point cloud. For example, the compensated points may be within the TriSoup node and/or may be within a distance to a line (e.g., the line $(C, \vec{n})$ 1420 as shown in FIG. 14A and FIG. 14B) that may pass through a centroid point (e.g., point C as shown in FIG. 14A and FIG. 14B) of the TriSoup node. As another example, the compensated points may be within the TriSoup node and/or may be within a distance to a line (e.g., the line $(C, \vec{n})$ 1420 as shown in FIG. 14A and FIG. 14B) that may pass through a first centroid vertex (e.g., point C as shown in FIG. 8A, FIG. 8B, FIG. 14A, and FIG. 14B) of the TriSoup node.

The decoder may determine a first centroid vertex (e.g., point C as shown in FIG. 8A and FIG. 8B) of a TriSoup. As discussed herein with respect to FIG. 8A and FIG. 8B, the decoder may determine a first centroid vertex based on TriSoup vertices $V_k$ of a TriSoup node. The decoder may determine a first centroid vertex, for example, as the mean of the TriSoup vertices $V_k$ of a TriSoup node.

At step 1656, the decoder may decode (e.g., entropy decode, arithmetically decode) the centroid residual value (e.g., $C_{res}$ as described herein with respect to FIG. 8B, FIG. 14A, FIG. 14B, FIG. 15, FIG. 16A and FIG. 16B). The decoder may decode (e.g., entropy decode, arithmetically decode) the centroid residual value, for example, based on the context/probability model. The decoder may decode the centroid residual value, for example, by decoding the second centroid residual value $\alpha'_{res}$ discussed herein. The decoder may select the context/probability model for decoding the centroid residual value. The decoder may select the context/probability model for decoding the centroid residual value, for example, based on a look up table that may map a neighborhood configuration to the context/probability model. The neighborhood configuration may be determined, for example, based on a motion compensated point cloud.

The decoder may select the context/probability model for decoding the centroid residual value, for example, based on a look up table that may map a subset of the symbols of a neighborhood configuration (e.g., only the subset of the symbols of the neighborhood configuration) to the context/probability model. The subset of the symbols of the neighborhood configuration may be determined, for example, based on a motion compensated point cloud. A quantity (e.g., number) of symbols in the subset may be increased, for example, based on a quantity (e.g., number) of decoded centroid residual values with neighborhood information comprising the same subset of symbols. The decoder may update the look up table to map the subset of symbols of the neighborhood configuration to a different context/probability model. The decoder may update the look up table to map the subset of symbols of the neighborhood configuration to a different context/probability model, for example, based on the centroid residual value.

The decoder may determine a second centroid vertex. The second centroid vertex may belong to a line (e.g., line $(C, \vec{n})$ 1520 as shown in FIG. 15) that may pass through a first centroid vertex (e.g., centroid point C as shown in and described with respect to FIG. 15) of the TriSoup node. The decoder may determine the second centroid vertex, for example, based on the first centroid vertex (e.g., vertex C as shown in and described with respect to FIG. 8A, FIG. 8B, FIG. 13, FIG. 14A, FIG. 14B, and FIG. 15) and a decoded centroid residual value (e.g., the centroid residual value $C_{res}$ or $\alpha_{res}$ decoded at step 1656 of FIG. 16B). The centroid residual value may be decoded, for example, to use the second centroid vertex $C+C_{res}$ (e.g., $C+C_{re}=C+\alpha_{res}n$ as described herein concerning FIG. 8B and FIG. 15) instead of the first centroid vertex (e.g., vertex C as shown in FIG. 8B and FIG. 15). By using the second centroid vertex (e.g., $C+C_{res}=C+\alpha_{res}n$ as described herein) as a pivoting vertex, the second centroid vertex may be closer to the points of the point cloud than the first centroid vertex, which may lead to a lower reconstruction error and lower distortion.

The decoder may determine the compensated intersection point (e.g., compensated intersection point $C_{comp}$ as shown in FIG. 15), for example, by projecting one or more of the compensated points onto a line (e.g., line $(C, \vec{n})$ 1520 as shown in FIG. 15) that may pass through a centroid point (e.g., point C as shown in FIG. 15) of the TriSoup node. The decoder may determine the compensated intersection point, for example, by averaging the projections of the one or more compensated points on the line. The decoder may determine a second centroid residual. The decoder may determine a second centroid residual, for example, based on a difference between the centroid residual value and a compensated residual value $\alpha_{comp}$. The decoder may determine the compensated residual value $\alpha_{comp}$, for example, based on the compensated intersection point. The decoder may select the context/probability model, for example, based on the compensated centroid residual value. The decoder may select the context/probability model, for example, based on a quantization of the compensated centroid residual value.

Figure 17:
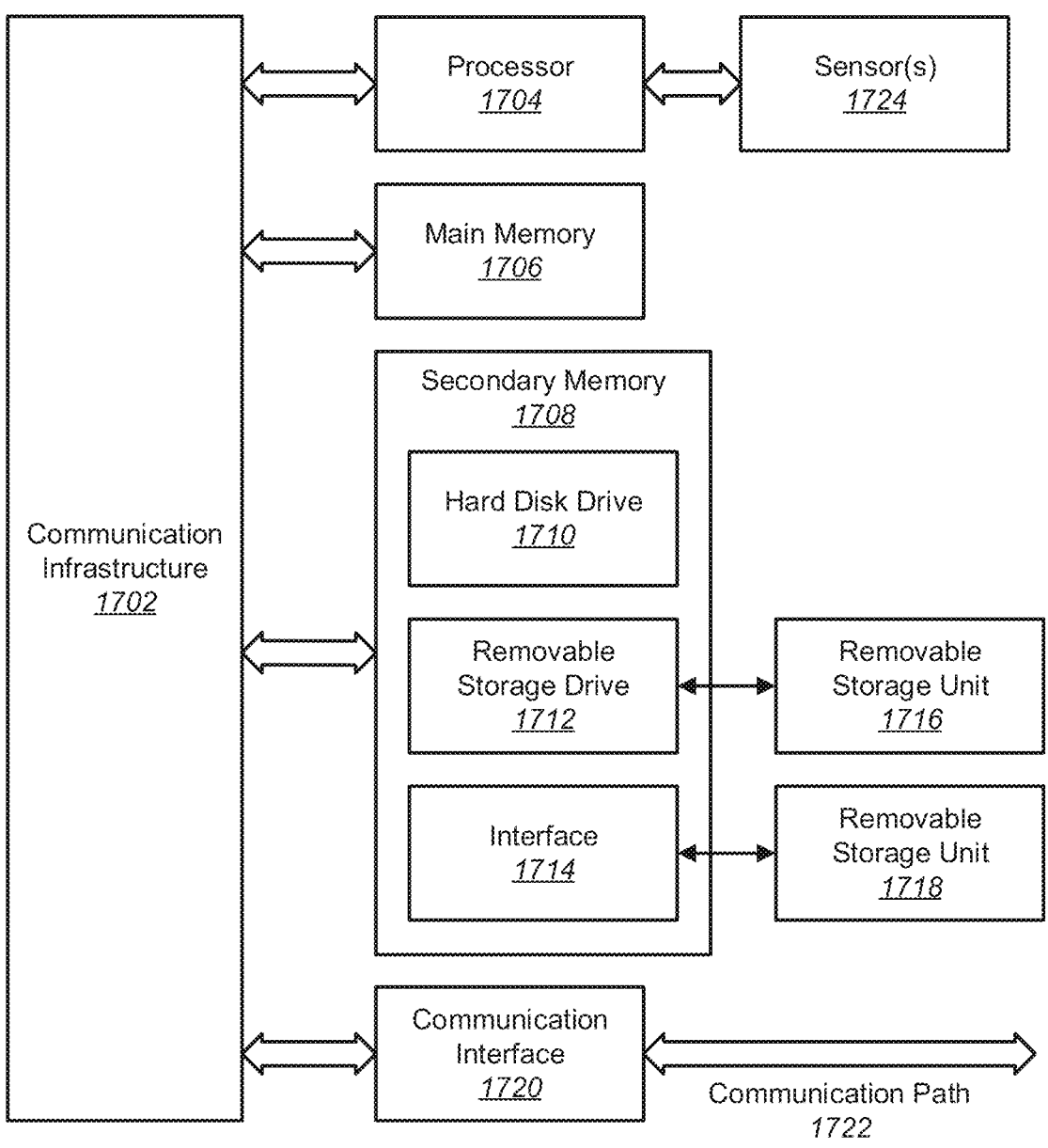
FIG. 17 shows an example computer system that may be used by any of the examples described herein.

FIG. 17 shows an example computer system that may be used by any of the examples described herein. For example, the example computer system 1700 shown in FIG. 32 may implement one or more methods described herein. For example, various devices and/or systems described herein (e.g., in FIGS. 1, 2, and 3) may be implemented in the form of one or more computer system 1700. Furthermore, each of the steps of the flowcharts depicted in this disclosure may be implemented on one or more computer systems 1700.

Computer system 1700 may comprise one or more processors, such as processor 1704. Processor 1704 may be a special purpose processor, general purpose processor, a microprocessor, and/or a digital signal processor. Processor 1704 may be connected to a communication infrastructure 1702 (e.g., a bus or network). Computer system 1700 may also comprise a main memory 1706 (e.g., a random access memory (RAM), and/or a secondary memory 1708.

Secondary memory 1708 may comprise a hard disk drive 1710 and/or a removable storage drive 1712 (e.g., a magnetic tape drive, an optical disk drive, or the like). Removable storage drive 1712 may read from and/or write to a removable storage unit 1716. Removable storage unit 1716 may comprise a magnetic tape, optical disk, and/or the like. Removable storage unit 1716 may be read by and/or may be written to removable storage drive 1712. Removable storage unit 1716 may comprise a computer usable storage medium having stored therein computer software and/or data.

Secondary memory 1708 may comprise other similar means for allowing computer programs or other instructions to be loaded into computer system 1700. Such means may include a removable storage unit 1718 and/or an interface 1714. Examples of such means may comprise a program cartridge and/or a cartridge interface (such as in video game devices), a removable memory chip (e.g., an erasable programmable read-only memory (EPROM) or a programmable read-only memory (PROM)) and associated socket, a thumb drive and Universal Serial Bus (USB) port, and/or other removable storage units 1718 and interfaces 1714, which may allow software and/or data to be transferred from removable storage unit 1718 to computer system 1700.

Computer system 1700 may comprise a communications interface 1720. Communications interface 1720 may allow software and/or data to be transferred between computer system 1700 and external device(s). Examples of communications interface 1720 may comprise a modem, a network interface (e.g., an Ethernet card), a communications port, etc. Software and/or data transferred via communications interface 1720 may be in the form of signals which may be electronic, electromagnetic, optical, and/or other signals capable of being received by communications interface 1720. The signals may be provided to communications interface 1720 via a communications path 1722. A communications path 1722 may carry signals and/or may be implemented using wire or cable, fiber optics, a phone line, a cellular phone link, a radio frequency (RF) link, and/or other communications channels.

Computer system 1700 may also comprise one or more sensor(s) 1724. Sensor(s) 1724 may measure and/or detect one or more physical quantities. Sensor(s) 1724 may convert the measured or detected physical quantities into an electrical signal in digital and/or analog form. For example, sensor(s) 1724 may include an eye tracking sensor to track the eye movement of a user. Based on the eye movement of a user, a display of a point cloud may be updated. In another example, sensor(s) 1724 may include a head tracking sensor (e.g., a gyroscope) to track the head movement of a user. Based on the head movement of a user, a display of a point cloud may be updated. In yet another example, sensor(s) 1724 may include a camera sensor for taking photographs and/or a 3D scanning device (e.g., a laser scanning, structured light scanning, and/or modulated light scanning device). 3D scanning devices may obtain geometry information by moving one or more laser heads, structured light, and/or modulated light cameras relative to the object or scene being scanned. The geometry information may be used to construct a point cloud.

A computer program medium and/or computer-readable medium may be used to refer to tangible (e.g., non-transitory) storage media, such as removable storage units 1716 and 1718 or a hard disk installed in hard disk drive 1710. These computer program products may be means for providing software to computer system 1700. Computer programs (also referred to as computer control logic) may be stored in main memory 1706 and/or secondary memory 1708. The computer programs may be received via communications interface 1720. Such computer programs, when executed, may enable the computer system 1700 to implement one or more example embodiments of the present disclosure as discussed herein. In particular, the computer programs, when executed, may enable processor 1704 to implement the processes of the present disclosure, such as any of the methods described herein. Accordingly, such computer programs may represent controllers of computer system 1700.

Figure 18:
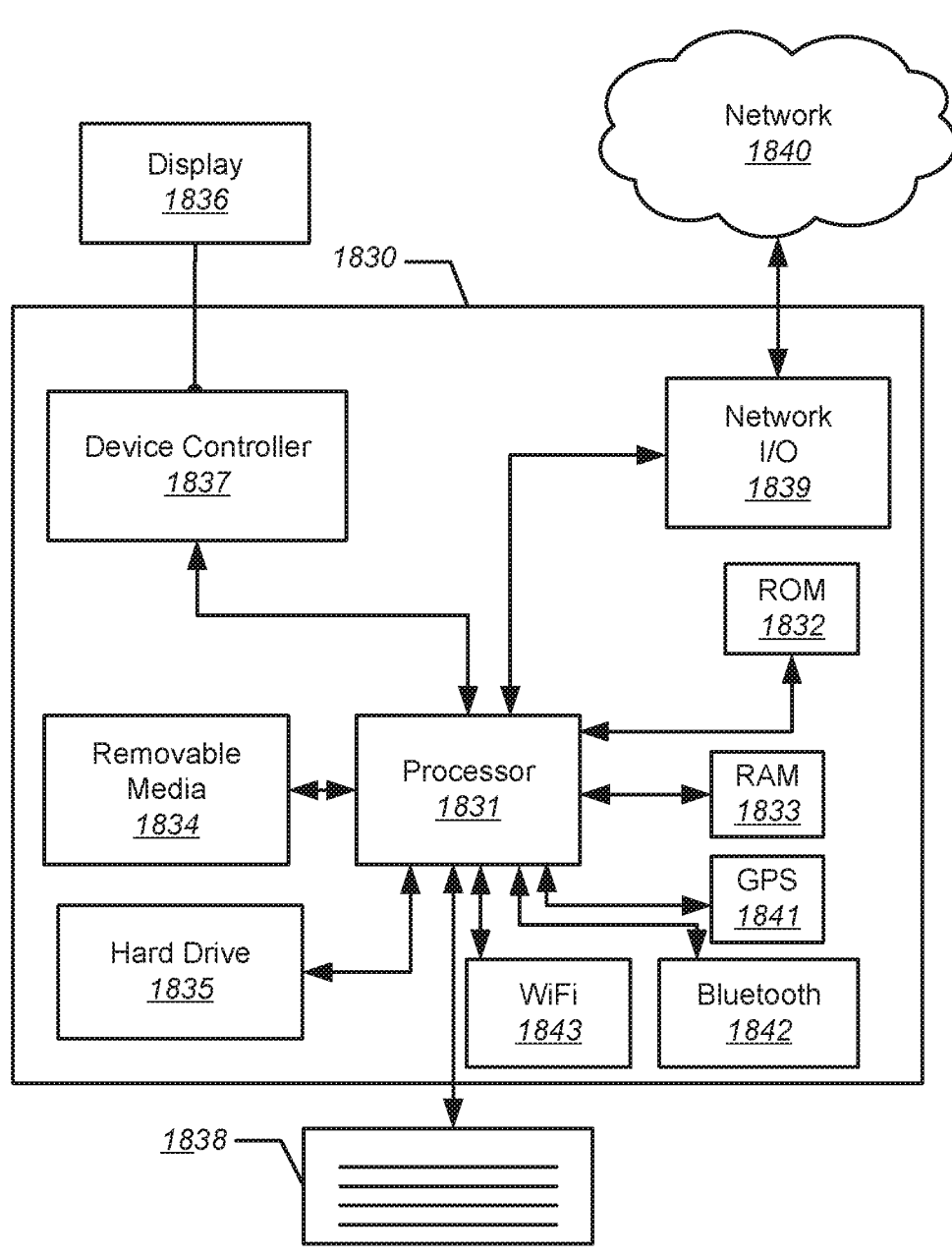
FIG. 18 shows example elements of a computing device that may be used to implement any of the various devices described herein.

FIG. 18 shows example elements of a computing device that may be used to implement any of the various devices described herein. For example, a source device (e.g., 102), an encoder (e.g., 114), a destination device (e.g., 106), a decoder (e.g., 120), and/or any computing device may be described herein. The computing device 1830 may include one or more processors 1831, which may execute instructions stored in the random-access memory (RAM) 2233, the removable media 1834 (e.g., a Universal Serial Bus (USB) drive, compact disc (CD) or digital versatile disc (DVD), or floppy disk drive), or any other desired storage medium. Instructions may also be stored in an attached (or internal) hard drive 1835. The computing device 1830 may also include a security processor (not shown), which may execute instructions of one or more computer programs to monitor the processes executing on the processor 1831 and any process that requests access to any hardware and/or software components of the computing device 1830 (e.g., ROM 1832, RAM 1833, the removable media 1834, the hard drive 1835, the device controller 1837, a network interface 1839, a GPS 1841, a Bluetooth interface 1842, a Wi-Fi interface 1843, etc.). The computing device 1830 may include one or more output devices, such as the display 1836 (e.g., a screen, a display device, a monitor, a television, etc.), and may include one or more output device controllers 1837, such as a video processor. There may also be one or more user input devices 1838, such as a remote control, keyboard, mouse, touch screen, microphone, etc. The computing device 1830 may also include one or more network interfaces, such as a network interface 1839, which may be a wired interface, a wireless interface, or a combination of the two. The network interface 1839 may provide an interface for the computing device 1830 to communicate with a network 1840 (e.g., a RAN, or any other network). The network interface 1839 may include a modem (e.g., a cable modem), and the external network 1840 may include communication links, an external network, an in-home network, a provider's wireless, coaxial, fiber, or hybrid fiber/coaxial distribution system (e.g., a DOCSIS network), or any other desired network. Additionally, the computing device 1830 may include a location-detecting device, such as a global positioning system (GPS) microprocessor 1841, which may be configured to receive and process global positioning signals and determine, with possible assistance from an external server and antenna, a geographic position of the computing device 1830.

The example in FIG. 18 may be a hardware configuration, although the components shown may be implemented as software as well. Modifications may be made to add, remove, combine, divide, etc. components of the computing device 1830 as desired. Additionally, the components may be implemented using basic computing devices and components, and the same components (e.g., processor 1831, ROM storage 1832, display 1836, etc.) may be used to implement any of the other computing devices and components described herein. For example, the various components described herein may be implemented using computing devices having components such as a processor executing computer-executable instructions stored on a computer-readable medium, as shown in FIG. 18. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine a first centroid vertex of a TriSoup node. The computing device may select, for example, based on a motion compensated point cloud, a context for decoding a centroid residual value. The computing device may decode, for example, based on the selected context, the centroid residual value. The computing device may determine, for example, based on the first centroid vertex and the decoded centroid residual value, a second centroid vertex. The centroid residual value may comprise at least a first component. The computing device may select the context, for example, based on compensated points in the motion compensated point cloud. The compensated points may be within at least one of: the TriSoup node; or a distance to a line intersecting a centroid value of the TriSoup node. The computing device may determine a compensated intersection point, for example, based on compensated points in the motion compensated point cloud. The computing device may select the context, for example, based on the compensated intersection point. The second centroid vertex may belong to a line that passes through the first centroid vertex. The motion compensated point cloud may be associated with a video frame or a point cloud frame. The computing device may select the context, for example, based on an association between a neighborhood configuration associated with the motion compensated point cloud and the context. The centroid residual value may comprise three components. The computing device may select a context for decoding a centroid residual value, for example, based on an association between a subset of symbols of a neighborhood configuration, determined based on a motion compensated point cloud, and the context. A number of the symbols in the subset of symbols may be increased, for example, based on a number of decoded centroid residual values with neighborhood configuration information comprising an identical subset of the symbols. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code (e.g., encode or decode) a video frame, a point cloud frame, or a point cloud sequence. A computer-readable medium may store instructions that, when executed, cause performance of the described method, additional operations and/or include the additional elements.

A computing device may perform a method comprising multiple operations. The computing device may determine a first centroid vertex of a TriSoup node. The computing device may select a context for decoding a centroid residual value, for example, based on an association between a subset of symbols of a neighborhood configuration, determined based on a motion compensated point cloud, and the context. The computing device may decode, for example, based on the selected context, the centroid residual value. The computing device may determine, for example, based on the first centroid vertex and the decoded residual value, a second centroid vertex. A number of the symbols in the subset of symbols may be increased, for example, based on a number of decoded centroid residual values with neighborhood configuration information comprising an identical subset of the symbols. The computing device may update, for example, based on the centroid residual value, the association to associate the subset of the symbols of the neighborhood configuration with a different context. The computing device may determine a compensated intersection point, for example, based on compensated points in the motion compensated point cloud. The compensated intersection point may belong to a line that passes through the first centroid vertex. The motion compensated point cloud may be associated with a video frame or a point cloud frame. The compensated points may be within at least one of: the TriSoup node; or a distance to a line intersecting a centroid value of the TriSoup node. The computing device may select the context, for example, based on a quantization of a compensated centroid residual value associated with the compensated intersection point. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code (e.g., encode or decode) a video frame, a point cloud frame, or a point cloud sequence. A computer-readable medium may store instructions that, when executed, cause performance of the described method, additional operations and/or include the additional elements.

A computing device may perform a method comprising multiple operations. The computing device may determine a centroid residual value of a TriSoup node. The computing device may select, for example, based on a motion compensated point cloud, a context for encoding the centroid residual value. The computing device may encode, for example, based on the selected context, the centroid residual value. The computing device may select the context for encoding the centroid residual value, for example, based on an association between a neighborhood configuration associated with the motion compensated point cloud and the context. The centroid residual value may comprise a least a first component. The computing device may select the context, for example, based on compensated points in the motion compensated point cloud. The compensated intersection may belong to a line that passes through a centroid point of the TriSoup node. The computing device may determine the compensated intersection point, for example, based on projecting one or more of the compensated points onto a line that passes through a centroid point of the TriSoup node. The computing device may determine the compensated intersection point, for example, based on averaging the projections of the one or more of the compensated points on the line. A number of symbols in the subset may be increased, for example, based on a number of coded (e.g., encoded or decoded) centroid residual values with neighborhood information comprising the same subset of symbols. The computing device may update the look up table to map the subset of symbols of the neighborhood configuration to a different context, for example, based on the centroid residual value. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code (e.g., encode or decode) a video frame, a point cloud frame, or a point cloud sequence. A computer-readable medium may store instructions that, when executed, cause performance of the described method, additional operations and/or include the additional elements.

A computing device may perform a method comprising multiple operations. The computing device may determine a centroid residual value of a TriSoup node. The computing device may select, for example, based on a motion compensated point cloud, a context/probability model for coding the centroid residual value. The computing device may entropy code the centroid residual value, for example, based on the context/probability model. The centroid residual value may comprise three components. The centroid residual value may comprise a single component. The computing device may select the context/probability model, for example, based on compensated points in the motion compensated point cloud. The compensated points may be within the TriSoup node. The compensated points may be within a distance to a line that intersects a centroid value of the TriSoup node. The computing device may determine a compensated intersection point, for example, based on the compensated points. The compensated intersection may belong to a line that passes through a centroid point of the TriSoup node. The computing device may determine the compensated intersection point, for example, based on projecting one or more of the compensated points onto a line that passes through a centroid point of the TriSoup node. The computing device may determine the compensated intersection point, for example, based on averaging the projections of the one or more of the compensated points on the line.

The computing device may select the context/probability model, for example, based on the compensated intersection point. The computing device may determine a second residual, for example, based on a difference between the centroid residual value and a compensated centroid residual value determined based on the compensated intersection point. The computing device may entropy code the second residual. The computing device may select the context/probability model, for example, based on the compensated centroid residual value. The computing device may select the context/probability model, for example, based on a quantization of the compensated centroid residual value. The computing device may select the context/probability model for coding the centroid residual value, for example, based on a look up table that maps a neighborhood configuration, determined based on a motion compensated point cloud, to the context/probability model. The computing device may select the context/probability model for coding the centroid residual value, for example, based on a look up table that maps only a subset of the symbols of a neighborhood configuration, determined based on a motion compensated point cloud, to the context/probability model. A number of symbols in the subset may be increased, for example, based on a number of coded centroid residual values with neighborhood information that may comprise the same subset of symbols. The computing device may update the look up table to map the subset of symbols of the neighborhood configuration to a different context/probability model, for example, based on the centroid residual value. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to code (e.g., encode or decode) a video frame, a point cloud frame, or a point cloud sequence. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated if its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. If implemented in software, firmware, middleware or microcode, the program code or code segments to perform the necessary tasks (e.g., a computer-program product) may be stored in a computer-readable or machine-readable medium. A processor(s) may perform the necessary tasks. Features of the present disclosure may be implemented in hardware using, for example, hardware components such as application-specific integrated circuits (ASICs) and/or gate arrays.

Implementation of a hardware state machine to perform the functions described herein may also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disc, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   determining, by a computing device, a first centroid vertex of a TriSoup node associated with a portion of a point cloud associated with content;
   selecting, based on a motion compensated point cloud, a context for decoding a centroid residual value;

based on the selected context, decoding the centroid residual value;

based on the first centroid vertex and the decoded centroid residual value, determining a second centroid vertex; and rendering, based on the second centroid vertex, the portion of the point cloud.

2. The method of claim 1, wherein the centroid residual value comprises at least a first component.

3. The method of claim 1, wherein selecting the context further comprises:

selecting the context based on compensated points in the motion compensated point cloud.

4. The method of claim 3, wherein the compensated points are within at least one of:

the TriSoup node; or a distance to a line intersecting a centroid value of the TriSoup node.

5. The method of claim 1, further comprising:

determining a compensated intersection point based on compensated points in the motion compensated point cloud.

6. The method of claim 5, wherein the selecting further comprises:

selecting the context based on the compensated intersection point.

7. The method of claim 1, wherein the second centroid vertex belongs to a line that passes through the first centroid vertex.

8. The method of claim 1, wherein the motion compensated point cloud is associated with a video frame.

9. The method of claim 1, wherein the selecting further comprises:

selecting the context based on an association between a neighborhood configuration associated with the motion compensated point cloud and the context.

10. The method of claim 1, further comprising:

rendering, based on the second centroid vertex, one or more of:

a virtual reality scene;

an augmented reality scene; or a mixed reality scene.

11. A method comprising:

determining, by a computing device, a first centroid vertex of a TriSoup node associated with a portion of a point cloud associated with content;

selecting a context for decoding a centroid residual value based on an association between a subset of symbols of a neighborhood configuration, determined based on a motion compensated point cloud, and the context;

based on the selected context, decoding the centroid residual value;

based on the first centroid vertex and the decoded residual value, determining a second centroid vertex; and rendering, based on the second centroid vertex, the portion of the point cloud.

12. The method of claim 11, wherein a quantity of the symbols in the subset of symbols is increased based on a quantity of decoded centroid residual values with neighborhood configuration information comprising an identical subset of the symbols.

13. The method of claim 11, further comprising:

based on the centroid residual value, updating the association to associate the subset of the symbols of the neighborhood configuration with a different context.

14. The method of claim 11, further comprising:

determining a compensated intersection point based on compensated points in the motion compensated point cloud, wherein the compensated intersection point belongs to a line that passes through the first centroid vertex.

15. The method of claim 14, wherein the motion compensated point cloud is associated with a video frame.

16. The method of claim 14, wherein the compensated points are within at least one of:

the TriSoup node; or a distance to a line intersecting a centroid value of the TriSoup node.

17. The method of claim 14, wherein the selecting the context further comprises:

selecting the context based on a quantization of a compensated centroid residual value associated with the compensated intersection point.

18. The method of claim 11, further comprising:

rendering, based on the second centroid vertex, one or more of:

a virtual reality scene;

an augmented reality; or a mixed reality scene.

19. A method comprising:

determining, by a computing device, a centroid residual value of a TriSoup node associated with a portion of a point cloud associated with content;

selecting, based on a motion compensated point cloud, a context for encoding the centroid residual value;

based on the selected context, encoding the centroid residual value; and encoding, based on the centroid residual value, the portion of the point cloud.

20. The method of claim 19, wherein the selecting further comprises:

selecting the context for encoding the centroid residual value based on an association between a neighborhood configuration associated with the motion compensated point cloud and the context.

21. The method of claim 19, wherein the centroid residual value comprises at least a first component.

22. The method of claim 17, wherein selecting the context further comprises:

selecting the context based on compensated points in the motion compensated point cloud.

23. The method of claim 19, further comprising:

encoding, based on the centroid residual value, one or more of:

a virtual reality scene;

an augmented reality scene; or a mixed reality scene.

* * * * *